US012039896B2

(12) United States Patent
Young et al.

(10) Patent No.: US 12,039,896 B2
(45) Date of Patent: Jul. 16, 2024

(54) LABEL INCLUDING A REMOVABLE PORTION CAPABLE OF FORMING A SEPARATE ARTICLE

(71) Applicant: Multi-Color Corporation, Batavia, OH (US)

(72) Inventors: Patrick A. Young, Appleton, WI (US); Dimitri Stamatiou, Green Bay, WI (US)

(73) Assignee: Multi-Color Corporation, Batavia, OH (US)

( * ) Notice: Subject to any disclaimer, the term of this patent is extended or adjusted under 35 U.S.C. 154(b) by 0 days.

(21) Appl. No.: 17/652,938

(22) Filed: Mar. 1, 2022

(65) Prior Publication Data

US 2022/0277670 A1 Sep. 1, 2022

Related U.S. Application Data

(60) Provisional application No. 63/154,946, filed on Mar. 1, 2021.

(51) Int. Cl.
*G09F 3/10* (2006.01)
*G09F 3/02* (2006.01)

(52) U.S. Cl.
CPC .................. *G09F 3/10* (2013.01); *G09F 3/02* (2013.01); *G09F 2003/0241* (2013.01); *G09F 2003/0257* (2013.01); *Y10T 428/14* (2015.01); *Y10T 428/28* (2015.01)

(58) Field of Classification Search
CPC .......................... G09F 3/10; G09F 3/02; G09F 2003/0241; G09F 2003/0257; G09F 3/0289; G09F 2003/0272; G09F 2003/0273; Y10T 428/14; Y10T 428/28
See application file for complete search history.

(56) References Cited

U.S. PATENT DOCUMENTS

| | | | | |
|---|---|---|---|---|
| 6,213,520 | B1 * | 4/2001 | Treleaven | G09F 3/0289 40/310 |
| 6,991,261 | B2 * | 1/2006 | Dronzek, Jr. | G09F 3/0288 40/310 |
| 7,237,583 | B2 | 7/2007 | Salani et al. | |
| 7,240,701 | B2 | 7/2007 | Salani et al. | |
| 7,383,863 | B2 | 6/2008 | Salani et al. | |
| 8,065,826 | B2 * | 11/2011 | Riis | G09F 3/02 40/310 |

(Continued)

FOREIGN PATENT DOCUMENTS

| | | | | |
|---|---|---|---|---|
| KR | 20110005550 U | * | 6/2011 | B65D 25/36 |
| WO | WO-2015197529 A1 | * | 12/2015 | B65D 23/08 |

*Primary Examiner* — Patricia L. Nordmeyer
(74) *Attorney, Agent, or Firm* — Wood Herron & Evans LLP

(57) ABSTRACT

A label including a separable article for use. The label includes a first portion adapted to be affixed to an article, and a second portion adapted to be separated from the first portion and removed from the remainder of the label. The second portion may be defined by at least one feature that facilitates removal of the second portion. And the second portion is capable of being formed into a second article following separation from the first portion, and may include an interior space capable of receiving a material therein or therethrough. The label including portion for forming a separable article may be formed in an inline process.

32 Claims, 12 Drawing Sheets

(56) References Cited

U.S. PATENT DOCUMENTS

| | | | | |
|---|---|---|---|---|
| 2007/0034285 | A1 | 2/2007 | Salani et al. | |
| 2008/0041491 | A1 | 2/2008 | Salani et al. | |
| 2010/0206428 | A1 | 8/2010 | Salani et al. | |
| 2015/0199924 | A1* | 7/2015 | Erenguc | B65D 81/36 40/638 |
| 2017/0148360 | A1* | 5/2017 | Corbett | G09F 3/02 |

* cited by examiner

LABEL INCLUDING A REMOVABLE PORTION CAPABLE OF FORMING A SEPARATE ARTICLE

CROSS-REFERENCE TO RELATED APPLICATIONS

This application claims priority to, and the benefit of the filing date of, U.S. Provisional Patent Application No. 63/154,946, titled “Label Including a Removable Portion Capable of Forming a Separate Article,” filed on Mar. 1, 2021, the disclosure of which is incorporated by reference herein in its entirety.

FIELD OF THE INVENTION

The present invention relates generally to labels for various articles, and more specifically to labels having a removable portion that can be used as a separate article.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

Various types of labels are known for applications to various types of articles (such articles including containers adapted to hold various products). In certain circumstances, it may be useful (or required) to have a separate article to use with the contents of a labeled article. For example, motor oil is a product that is typically provided in a container with a screw off cap. Such motor oil is sold in most retail distribution markets as well as in various service stations. Once purchased, the oil is transferred from the container into a car, lawnmower, or other machinery. In order to avoid spilling the oil outside the engine, a funnel is inserted into the oil receiving receptacle of the engine, and the oil poured into the funnel to be directed into the oil receiving receptacle.

At times, a funnel may not be readily available and so consumers risk spilling oil on various engine parts, onto garage floor, or parking lot/road, or lawn, etc. while attempting to pour the oil into the oil receiving receptacle of the engine. In order to resolve this problem, many auto businesses will loan a funnel to a consumer if oil is to be immediately poured into an oil receiving compartment of an engine—or may provide a disposable funnel (made of a thick stock of paper or other material) which can be used to directed poured oil into an engine and then discarded (typically after a single use). However, in all of these instances, the funnel is separate from the oil container, and thus may not be obtained by a user—such that the consumer ends up having to try and pour oil into an engine without the use of a funnel (possibly resulting in the drawbacks described above).

While this issue has been described with respect to motor oil, it will be recognized by those of ordinary skill in the art that there can be any number of other examples of a product that is provided in a container—but which may need (or find useful) the use of a separate article in order to use the contents of the container (or increase the ease of use of the contents of the container).

In view of the above, a better manner for providing a separate article for those products that require (or would benefit from) such a separate article would be desirable.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

One aspect of the present invention overcomes the drawbacks described above by providing a label for a container, wherein at least a portion of the label is, or can be formed into, a separate article for use with the container, or with contents of the container. In one example, a portion of the label may be a funnel, or be capable of being formed into a funnel, that may be used with contents of a container—such as with motor oil. In another example, a portion of the label may be a cup, or be capable of being formed into a cup, such as a dosing cup or measuring cup.

These and other advantages of the application will be apparent to those of skill in the art with reference to the drawings and the detailed description below.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE INVENTION

Figure 1A:
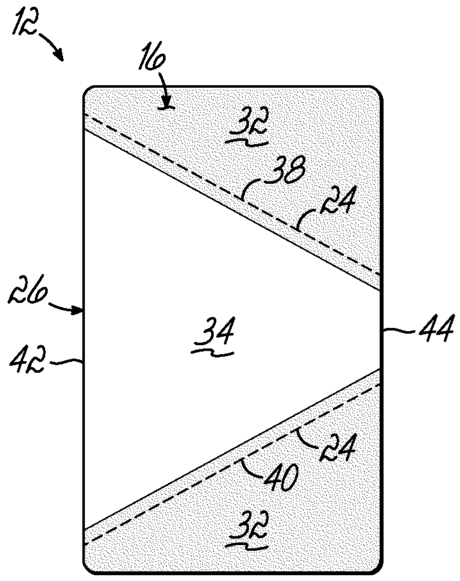
FIG. 1A is a view of a face surface of a base layer of a first embodiment of a label in accordance with principles of the present invention.
Figure 1B:
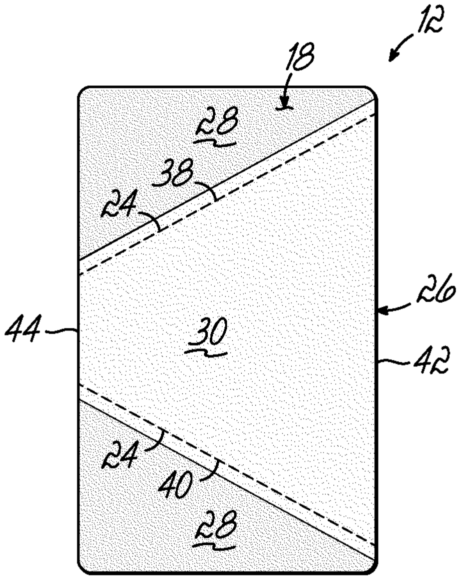
FIG. 1B is a view of a back surface of the base layer of the first embodiment of a label in accordance with principles of the present invention.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, one aspect of the present invention overcomes the drawbacks described above by providing a label for a container, wherein at least a portion of the label is, or can be formed into, a separate article for use with the container, or with contents of the container. In one example, a portion of the label may be a funnel, or be capable of being formed into a funnel, that may be used with contents of a container—such as with motor oil. In another example, a portion of the label may be a cup, or be capable of being formed into a cup, such as a dosing cup or measuring cup. Such a separate article may be used fin conjunction with contents of the original container, or may be used for materials not associated with the original container. As a non-limiting example, a measuring cup could be used for measurement of dry goods and other products (e.g., a protein drink powder, where a user could use the cup to measure the proper amount of powder).

A first embodiment of a label in accordance with aspects of the present invention is shown in FIGS. 1A-5B. The concept of this first embodiment includes a label— such as a pressure sensitive label—having a removable portion that may form another object, such as a funnel. The label of this embodiment, a pressure sensitive label including a removable funnel portion, may be formed from a single in-line process. Thus, the design of such a removable funnel portion within a multi-ply label created entirely from an in-line construction, results in a label having a funnel that is not a pre-produced secondary funnel that is applied and/or attached to a label (as is seen in the prior art).

The label, then, includes a funnel by constructing multiple layers of differing label materials—such as paper and/or film. Pattern printing of tinted and spot coatings, spot adhesive, spot printed cold glue, along with positioned internal die cuts may be used to create a funnel from the multi-ply label when the portion that can form the funnel is removed. In particular, the first embodiment as illustrated in the figures shows a 2-ply material of in-line construction, with a funnel built into the label for removal therefrom. Designed cut tooling, coatings, glue, and adhesive are used to create the label and funnel.

Figure 2A:
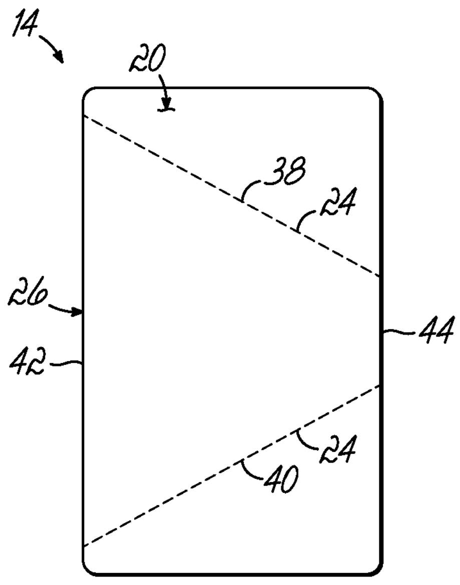
FIG. 2A is a view of a face surface of a top layer of the first embodiment of a label in accordance with principles of the present invention.
Figure 2B:
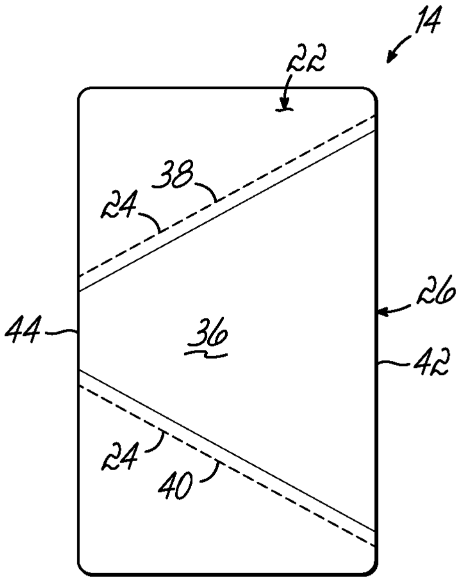
FIG. 2B is a view of a back surface of the top layer of the first embodiment of a label in accordance with principles of the present invention.

More specifically, and referring to FIGS. 1A-2B, the label 10 of this first embodiment includes a first layer 12 (a base ply layer—seen in FIGS. 1A and 1B), and a second layer 14 (a top ply layer—seen in FIGS. 2A and 2B). FIG. 1A shows a face surface 16 of the base ply 12 (i.e., the surface that will be positioned to confront other layer(s) of the label 10). And FIG. 1B shows the back surface 18 of the base ply 12 (i.e., the surface that will be positioned to confront an article to which the label 10 may be applied). FIG. 2A shows a face surface 20 of the top ply 14 (i.e., the surface that will be positioned to face away from other layer(s) of the label 10). And FIG. 2B shows a back surface 22 of the top ply 14 (i.e., the surface that will be positioned to confront other layer(s) of the label 10).

As can be seen in FIGS. 1A-2B the various back and face surfaces of the base ply 12 and top ply 14 may include other materials applied thereto (such materials may include adhesives and varnishes). And, as can be seen in the figures, the various layers include cuts 24 that serve to help define the removable funnel portion 26 of the label 10 (and facilitate the removal of the funnel portion for use). The use of other materials—such as adhesives, varnishes, etc.—also facilitate removal of that funnel portion. Thus, once the layers of the label 10 are assembled (e.g., as shown in FIG. 4A) the full construction of the first embodiment of the label 10 including a removable funnel portion 26 may be seen.

Figure 4A:
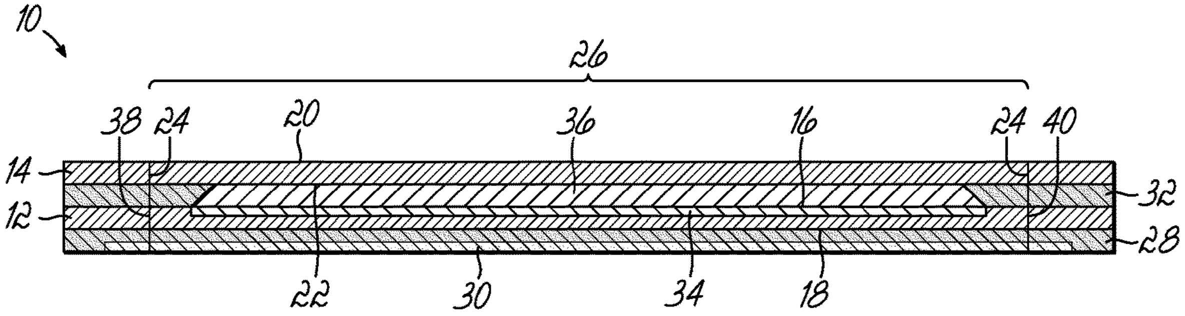
FIG. 4A is a cross-section view of the layers of the first embodiment of a label.
Figure 4B:
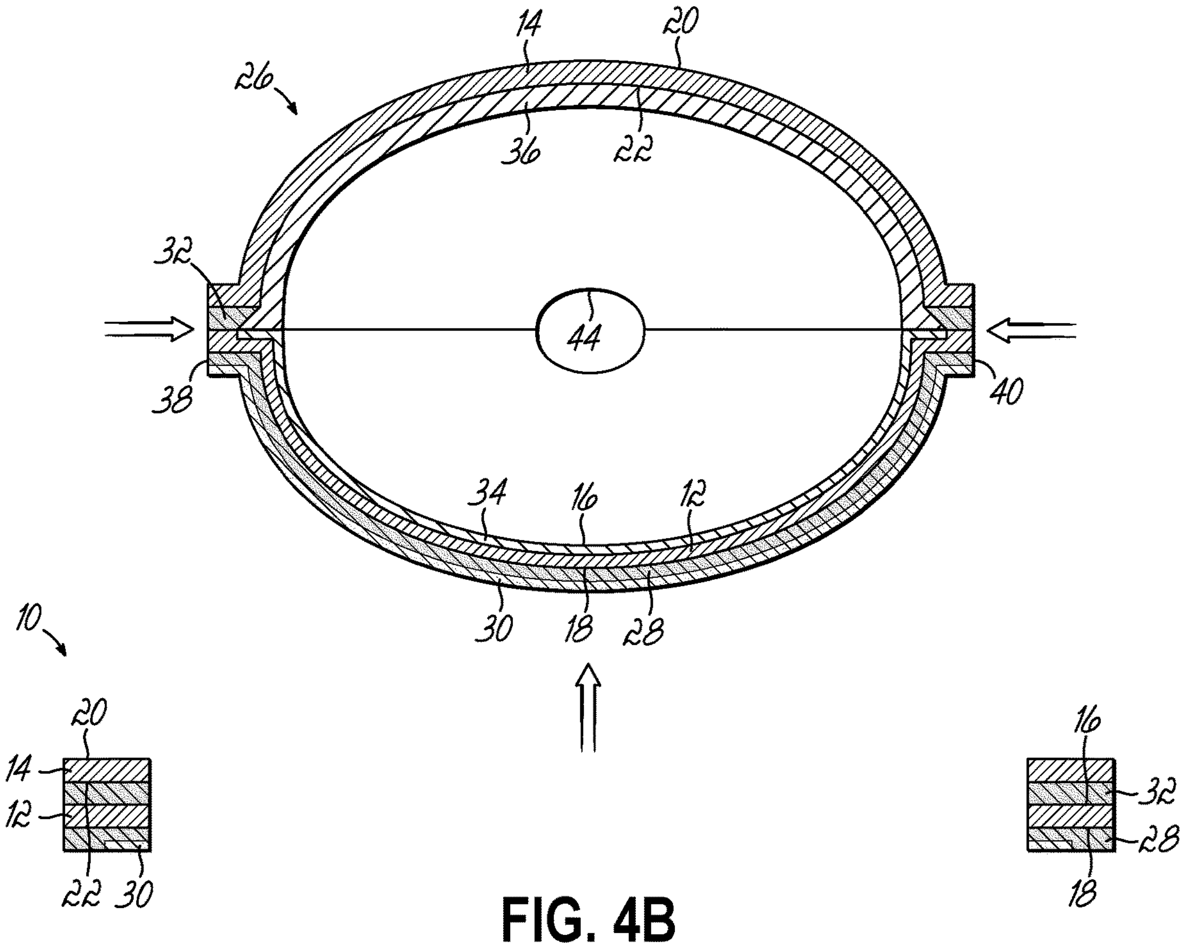
FIG. 4B is a cross-section view of the funnel portion of the first embodiment removed from the label and opened.

More specifically, and referring to FIG. 4A, a cross section of the first embodiment of the label 10 is shown. Both the first layer 12 (base ply) and second layer 14 (top ply) can be seen in cross-section. A first adhesive 28 (which may be a permanent adhesive in this embodiment) is positioned on the back surface 18 of the base ply 12. This adhesive can also be seen in FIG. 1B. The permanent adhesive 28 may be a permanent pressure sensitive adhesive. It facilitates affixing of the label 10 to an article to which it is applied and holds the label 10 in place as the funnel portion of the label 10 is removed (which will be described in greater detail below). A first varnish 30 (being a tinted varnish in this embodiment) is printed on the permanent adhesive 28 (as can be seen in the figures) and is positioned in generally the same area and configuration as the removable portion 26 of the label 10. The tinted varnish 30 may be patterned. The tinted varnish pattern serves to reduce the tack of the permanent adhesive 28 in the area of the removable portion 26 of the label 10. This adhesive also helps in affixing the label 10 to an article—but is of light enough tack in the removable portion 26 to allow the removable funnel portion 26 to be peeled away from the article for use.

As described above, the opposite side (i.e., the face surface 16) of the first layer 12 (base ply) is positioned to confront other layer(s) of the label 10—e.g., the second layer 14 (top ply) in the first embodiment. In this configuration, another adhesive (a second adhesive 32) may be positioned between the first layer 12 (base ply) and second layer 14 (top ply). Thus, when the layers of the label 10 are fully assembled (as shown in FIG. 4A), this second adhesive adheres at least a portion of the face surface 16 of the base ply 12 to the back surface 22 of the top ply 14. In particular, in the first embodiment, this second adhesive 32 (e.g., a permanent glue) is applied to those areas of the face surface 16 that are not part of the removable portion 26 (though there is some overlap onto the removable portion 26 proximal to the edges 38, 40 of the removable funnel portion 26). (In FIGS. 1A-2B, this permanent glue 32 is shown as being disposed on the face surface 16 of the base ply 12 prior to assembly. However, in alternate embodiments, it may be the case that the second adhesive 32 is first applied to the back surface 22 of the top ply 14 before being brought into contact with the face surface 16 of the base ply 12. Still alternatively, such second adhesive 32 (permanent glue) may be applied to both a portion of the face surface 16 of base ply 12 and a portion of back surface 22 of top ply 14.)

Further, as can be seen in the Figures, a second varnish 34 is applied to the face surface 16 of the base ply 12, and a third varnish 36 is positioned such that it is on top of the second varnish 34 ("on top of" in the orientation of the label shown in FIG. 4A). In other words, the third varnish 36 is positioned between the second varnish 34 and the back surface 22 of the top ply 14, in a location generally matching the portions of the base ply 12 and top ply 14 that include the removable funnel portion 26. The positioning of the third varnish 36 may be accomplished by applying the third varnish 36 to the back surface 22 of the top ply 14. Alternatively, the third varnish 36 may be applied to the second varnish 34 in a manner in which the two layers of varnish 34, 36, remain separable when the funnel portion 26 is ultimately removed from the remainder of the label 10 and opened.

These second and third varnishes 34, 36 may create a product barrier within the funnel. In that regard, the label 10 described herein may employ various materials as the base ply and top ply. For example, the base ply and the top ply may be made from paper or film (various papers and films suitable for pressure sensitive labels are known to those of ordinary skill in the art). Thus, the embodiment illustrated as in FIG. 4A (i.e., having the two layers of varnish 34, 36 adjacent one another) may be used when the base ply and top ply are paper-based, for example. When the base and top plies are paper-based, the presence of the second varnish 34 adjacent the face surface 16 of the base ply and the third varnish 36 adjacent the back surface 22 of the top ply 14 provide a sealing function to the interior of the funnel once opened (should the funnel, for example, be used with a liquid). In alternate embodiments, such as where the base and top plies may be made from liquid-impermeable or liquid-resistant films, sealing with two layers of varnish may not be needed. Such an embodiment may include only one layer of varnish in the removable region, to facilitate opening of the funnel once removed (other alternative embodiments may forgo any varnish at this location).

Further, as can be seen in FIGS. 2A and 2B, the top ply 14 is adapted to be positioned on top of the second layer of adhesive and third varnish with the back surface 22 of the top ply 14 being adjacent to the second layer of adhesive and third varnish (as shown in FIG. 4A). The top ply 14 may be paper-based or film-based.

Thus, in certain iterations of the first embodiment of the label 10, the base ply 12 may be a pressure sensitive paper having pattern screened deadened adhesive (used as the light tack adhesive) disposed substantially in register with the removable funnel portion 26 of the label 10. This results in the semi-adherence of the label 10 (at least at the removable portion 26) to the article. And the top ply 14 may be a non-pressure sensitive, raw paper or film with or without a clear overlaminant adhered to the face surface 20 thereof.

This top ply is permanently adhered to the face of the base ply material, with a void of glue in the center funnel functioning area. This web is permanently adhered along the edges 38, 40 of the funnel shape to create a seal along both outer sides (as will be described in greater detail below).

Next, as can be seen from the Figures, the first and second layers 12, 14 (i.e., base ply 12 and top ply 14) of the label 10 include die cuts 24 that define a border between the removable funnel portion 26 of the label 10 and the remainder of the label 10. The die cuts 24 may be of any type, depth, etc. that allows for removal of the funnel portion when needed. Perforations may also be used. (In other embodiments, any manner of weakened area that allows removable portion to be separated may be used.) During preparation of the label 10 during the in-line process, with the webs printed and spot adhered together, a single tool die cuts the label shape. The external portion cuts the entire label shape, with internal cuts creating the funnel within the label 10.

Further, as noted above, a second adhesive 32 may be positioned between the first layer 12 (base ply) and second layer 14 (top ply). Thus, when the layers of the label 10 are fully assembled (as shown in FIG. 4A), this second adhesive 32 adheres at least a portion of the face surface 16 of the base ply 12 to the back surface 22 of the top ply 14. As can be particularly seen in FIG. 1A, this second adhesive 32 (e.g., a permanent glue) is positioned on both sides of the die cuts 24. Thus, while the majority of the second adhesive 32 coats the face surface 16 of the base ply 12 that is not part of the removable portion 26 (in the embodiment shown in FIGS. 1A-5B), at least a portion (forming strips of adhesive, are present on the removable portion 26 along the length of the die cuts 24. These strips of second adhesive 32 serve to keep the two edges 38, 40 (formed by edges 38, 40 of removable portion base ply and top ply) of the funnel permanently bonded to one another to allow for the closed receptacle area of the funnel.

Further, the majority of the second adhesive 32 is positioned on the face surface 16 of the base ply 12 along the sides of the removable portion 26 of the label 10. There is no second adhesive along the top portion 42 of the removable funnel portion 26 or the bottom portion 44 of the removable funnel portion 26. This allows the funnel portion to be open at its top and bottom ends 42, 44 once removed from the remainder of the label 10.

Further, as noted above, an aspect of the invention is that the label 10 may be formed in a single in-line process. Forming the label 10 entirely from an in-line process results in a label having a funnel that is not a pre-produced secondary funnel that is applied and/or attached to a label (as is seen in the prior art). Thus, the label 10, as described herein, includes a removable funnel portion 26 that is formed via multiple layers of differing label materials (such as paper and/or film) with printing of varnishes, adhesives, etc., along with positioned internal die cuts to create a funnel from the multi-ply label when the portion that can form the funnel is removed. In this aspect, the first embodiment (for example) may be formed in-line by applying first adhesive 28 (e.g., pressure sensitive adhesive) to the back surface 18 of base ply 12, along with applying first varnish 30 (e.g., tinted varnish) to first adhesive 28 in area that corresponds to removable funnel portion 26. Further, in this process, a second varnish 34 may be put down on face surface 16 of base ply 12. Second adhesive (permanent glue) 32 is applied to face surface 16 of base ply 12 in area that is not substantially in register with removable portion 26. In an embodiment, in this in-line process, third varnish 36 is applied to back surface 22 of top ply 14 substantially in register with removable portion 26—and top ply 14 may be put down over base ply 12 (having permanent glue 32 and second varnish 34). During this in-line process die cuts 24 are made to define removable portion 26 and to facilitate removal of removable portion 26 from remainder of label 10. This is an example of how embodiments of the label would be made in a single in-line process. It will be apparent to those of ordinary skill in the art that not all embodiments need to follow the process laid out above—but may follow other steps of an in-line process that result in the embodiments shown herein. Additionally, other embodiments (having different layers, materials, etc.) are described below—and those of ordinary skill in the art will understand that the principles of constructing the label described above in an in-line process are applicable to the other embodiments described herein. Further, it will be apparent to those of ordinary skill in the art that certain materials, layer, etc. may be supplied with some materials already applied (as one non-limiting example, one might obtain a base ply already having a pressure sensitive adhesive on a back surface thereof, and may use this as a material in the process where remaining layers materials are then "built" upon base layer).

Figure 3A:
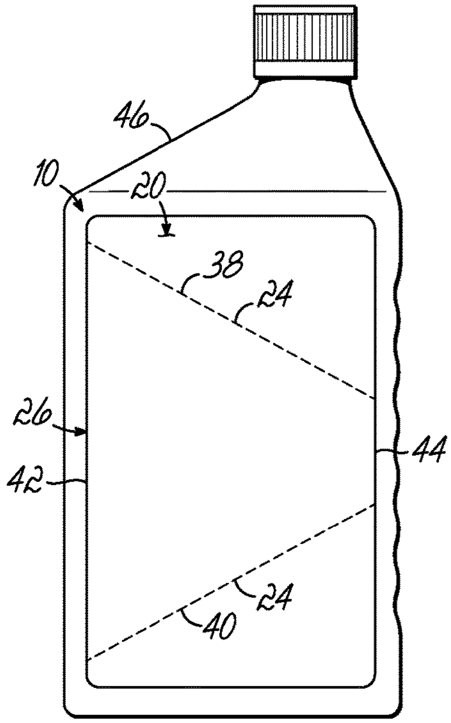
FIG. 3A is a view of the first embodiment of a label associated with an article.
Figure 3B:
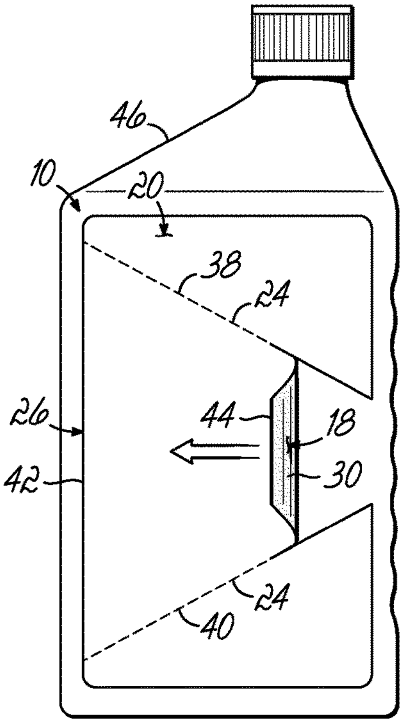
FIG. 3B is a view of the first embodiment of a label associated with an article, depicting removal of a funnel portion of the label from the remainder of the label.

Following assembly, the label 10 may be applied to an article 46 (such as the article 46 shown in FIGS. 3A and 3B). FIG. 3A shows the first embodiment of the label 10 applied to the article 46, and FIG. 3B shows the beginning of removal of the removable funnel portion 26 of the label 10 from the remainder of label 10, and from article 46. Removal occurs along die cuts 24.

Figure 5A:
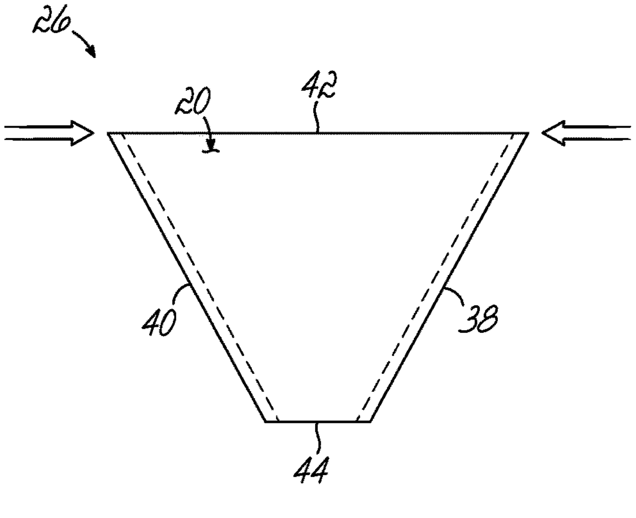
FIG. 5A is a view of the funnel portion having been removed from the first embodiment of the label.
Figure 5B:
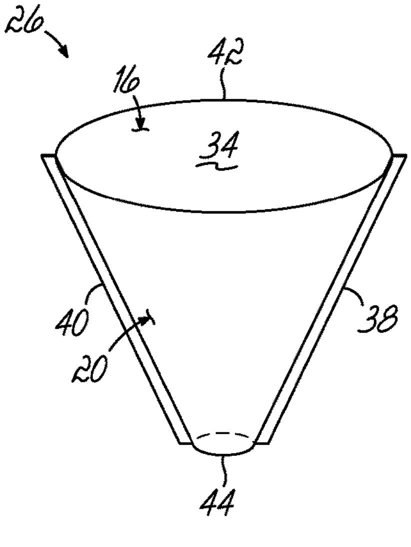
FIG. 5B is a view of the funnel portion of the first embodiment having been opened for use as a funnel.

Once removed, the funnel portion may be opened, such as by pressing side edges 38, 40 of funnel toward one another (as represented in FIG. 5A). This forms an open funnel as shown in FIG. 5B with permanently glued side edges 38, 40, and open top and bottom ends 42, 44 of funnel. A cross-section view of the label 10, with the funnel removed and opened can be seen in FIG. 4B. The varnish (seen in FIGS. 1A, 2B, and 4A)—such as second varnish 34, or second and third varnishes 34, 36—is disposed on inside surface of open funnel. This allows for ease of opening funnel, and may also contribute to liquid impermeability of the funnel.

A second embodiment of a label in accordance with aspects of the present invention is shown in FIGS. 6A-10B. The concept of this second embodiment includes a label—such as a pressure sensitive label—having a removable portion that may form another object, such as a cup. The label of this embodiment, a pressure sensitive label including a removable cup portion, may be formed from a single in-line process. Thus, the design of such a removable cup portion within a multi-ply label created entirely from an in-line construction, results in a label having a cup that is not a pre-produced secondary cup that is applied and/or attached to a label (as is seen in the prior art).

The label, then, includes a cup by constructing multiple layers of differing label materials—such as paper and/or film. Pattern printing of tinted and spot coatings, spot adhesive, spot printed cold glue, along with positioned internal die cuts may be used to create a cup from the multi-ply label when the portion that can form the cup is removed. In particular, the second embodiment as illustrated in the figures shows a 2-ply material of in-line construction, with a cup built into the label for removal therefrom. Designed cut tooling, coatings, glue, and adhesive are used to create the label and cup.

Figure 6A:
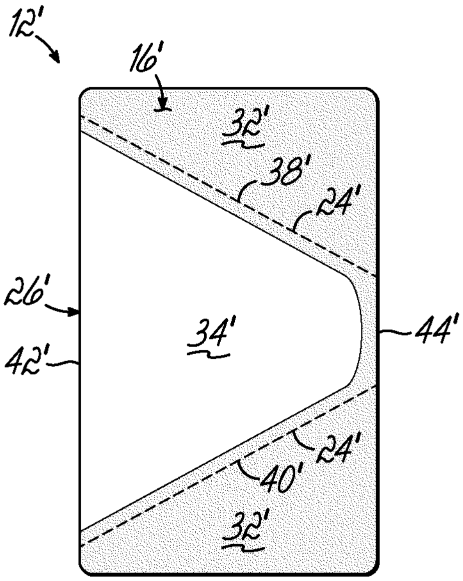
FIG. 6A is a view of a face surface of a base layer of a second embodiment of a label in accordance with principles of the present invention.
Figure 6B:
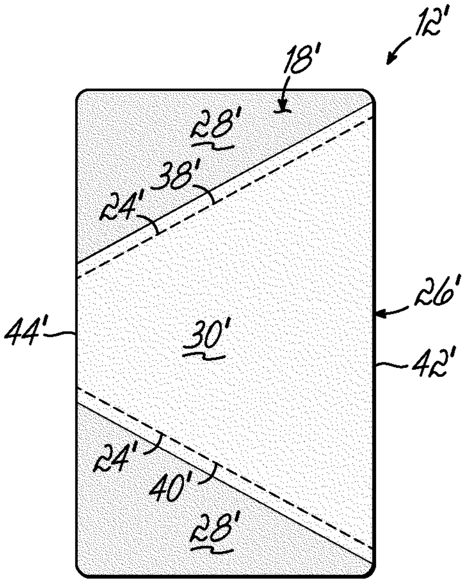
FIG. 6B is a view of a back surface of the base layer of the second embodiment of a label in accordance with principles of the present invention.
Figure 7A:
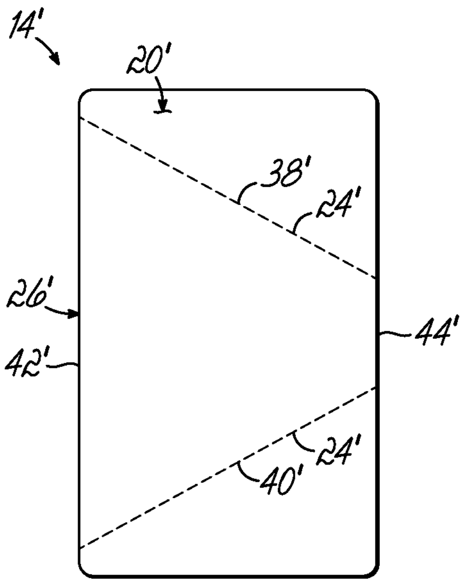
FIG. 7A is a view of a face surface of a top layer of the second embodiment of a label in accordance with principles of the present invention.
Figure 7B:
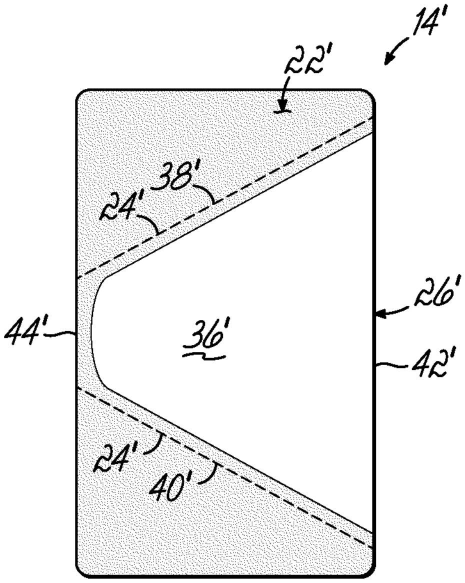
FIG. 7B is a view of a back surface of the top layer of the second embodiment of a label in accordance with principles of the present invention.

More specifically, and referring to FIGS. 6A-7B, the label 10' of this second embodiment includes a first layer 12' (a base ply layer—seen in FIGS. 6A and 6B), and a second layer 14' (a top ply layer—seen in FIGS. 7A and 7B). FIG. 6A shows a face surface 16' of the base ply 12' (i.e., the surface that will be positioned to confront other layer(s) of the label 10'). And FIG. 6B shows the back surface 18' of the base ply 12' (i.e., the surface that will be positioned to confront an article to which the label 10' may be applied). FIG. 7A shows a face surface 20' of the top ply 14' (i.e., the surface that will be positioned to face away from other layer(s) of the label 10'). And FIG. 7B shows a back surface 22' of the top ply 14' (i.e., the surface that will be positioned to confront other layer(s) of the label 10').

As can be seen in FIGS. 6A-7B the various back and face surfaces of the base ply 12' and top ply 14' may include other materials applied thereto (such materials may include adhesives and varnishes). And, as can be seen in the figures, the various layers include cuts 24' that serve to help define the removable cup portion 26' of the label 10' (and facilitate the removal of the cup portion for use). The use of other materials—such as adhesives, varnishes, etc.—also facilitate removal of that cup portion. Thus, once the layers of the label 10' are assembled (e.g., as shown in FIG. 9A) the full construction of the second embodiment of the label 10' including a removable cup portion 26' may be seen.

Figure 9A:
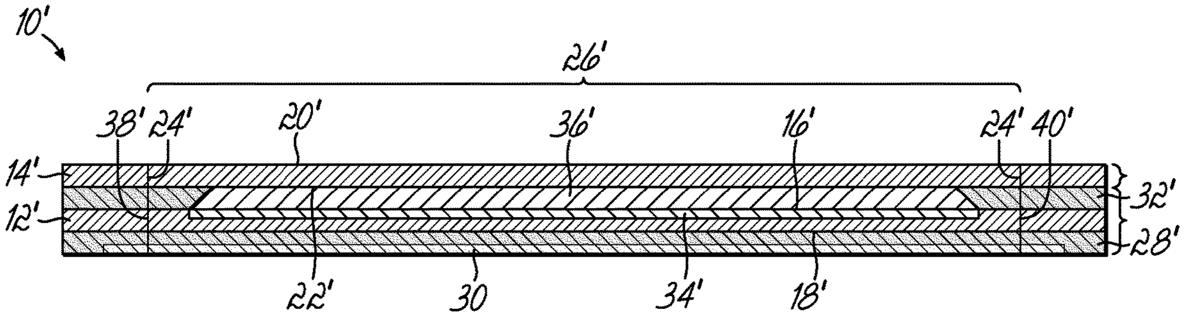
FIG. 9A is a cross-section view of the layers of the second embodiment of a label.
Figure 9B:
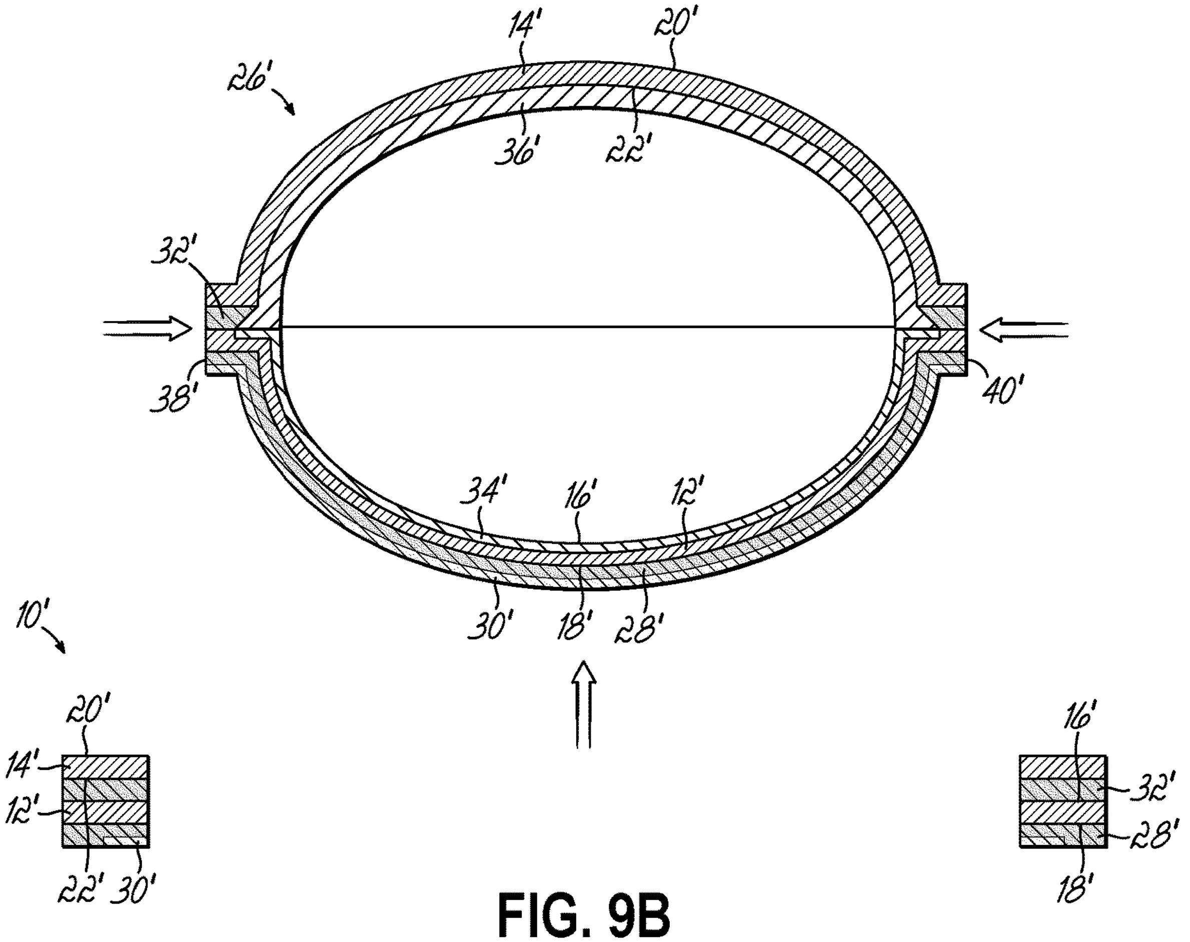
FIG. 9B is a cross-section view of the cup portion of the second embodiment removed from the label and opened.

More specifically, and referring to FIG. 9A, a cross section of the second embodiment of the label 10' is shown. Both the first layer 12' (base ply) and second layer 14' (top ply) can be seen in cross-section. A first adhesive 28' (such as a permanent adhesive in this embodiment) is positioned on the back surface 18' of the base ply 12'. This adhesive can also be seen in FIG. 6B. The permanent adhesive 28' may be a permanent pressure sensitive adhesive. It facilitates affixing of the label 10' to an article to which it is applied and holds the label 10' in place as the cup portion of the label 10' is removed (which will be described in greater detail below). A first varnish 30' (such as a tinted varnish in this embodiment) is printed on the permanent adhesive 28' (as can be seen in the figures) and is positioned in generally the same area and configuration as the removable portion 26' of the label 10'. The tinted varnish 30' may be patterned. The tinted varnish pattern serves to reduce the tack of the permanent adhesive 28' in the area of the removable portion 26' of the label 10'. This adhesive also helps in affixing the label 10' to an article—but is of light enough tack in the removable portion 26' to allow the removable cup portion 26' to be peeled away from the article for use.

As described above, the opposite side (i.e., the face surface 16') of the first layer 12' (base ply) is positioned to confront other layer(s) of the label 10'—e.g., the second layer 14' (top ply) in the second embodiment. In this configuration, another adhesive (a second adhesive 32') may be positioned between the first layer 12' (base ply) and second layer 14' (top ply). Thus, when the layers of the label 10' are fully assembled (as shown in FIG. 9A), this second adhesive adheres at least a portion of the face surface 16' of the base ply 12' to the back surface 22' of the top ply 14'. In particular, in the second embodiment, this second adhesive 32' (e.g., a permanent glue) is applied to those areas of the face surface 16' that are not part of the removable portion 26' (though there is some overlap onto the removable portion 26' proximal to the edges 38', 40' of the removable cup portion 26'). (In FIGS. 6A-7B, this permanent glue 32' is shown as being disposed on the face surface 16' of the base ply 12' prior to assembly. However, in alternate embodiments, it may be the case that the second adhesive 32' is first applied to the back surface 22' of the top ply 14' before being brought into contact with the face surface 16' of the base ply 12'. Still alternatively, such second adhesive 32' (permanent glue) may be applied to both a portion of the face surface 16' of base ply 12' and a portion of back surface 22' of top ply 14'.)

Further, as can be seen in the Figures, a second varnish 34' is applied to the face surface 16' of the base ply 12', and a third varnish 36' is positioned such that it is on top of the second varnish 34' ("on top of" in the orientation of the label shown in FIG. 9A). In other words, the third varnish 36' is positioned between the second varnish 34' and the back surface 22' of the top ply 14', in a location generally matching the portions of the base ply 12' and top ply 14' that include the removable cup portion 26'. The positioning of the third varnish 36' may be accomplished by applying the third varnish 36' to the back surface 22' of the top ply 14'. Alternatively, the third varnish 36' may be applied to the second varnish 34' in a manner in which the two layers of varnish 34', 36', remain separable when the cup portion 26' is ultimately removed from the remainder of the label 10' and opened.

These two layers of varnish 34', 36' may create a product barrier within the cup. In that regard, the label 10' described herein may employ various materials as the base ply and top ply. For example, the base ply and the top ply may be made from paper or film (various papers and films suitable for pressure sensitive labels are known to those of ordinary skill in the art). Thus, the embodiment illustrated as in FIG. 9A (i.e., having the two layers of varnish 34', 36' adjacent one another) may be used when the base ply and top ply are paper-based, for example. When the base and top plies are paper-based, the presence of the second varnish 34' adjacent the face surface 16' of the base ply and the third varnish 36' adjacent the back surface 22' of the top ply 14' provide a sealing function to the interior of the cup once opened (should the cup, for example, be used with a liquid). In alternate embodiments, such as where the base and top plies may be made from liquid-impermeable or liquid-resistant films, sealing with two layers of varnish may not be needed. Such an embodiment may include only one layer of varnish in the removable region, to facilitate opening of the cup once removed (other alternative embodiments may forgo any varnish at this location).

Further, as can be seen in FIGS. 7A and 7B, the top ply 14' is a ply is positioned on top of the second layer of adhesive and third varnish with the back surface 22' of the top ply 14' being adjacent to the second layer of adhesive and third varnish (as shown in FIG. 9A). The top ply 14' may be paper-based or film-based.

Thus, in certain iterations of the second embodiment of the label 10', the base ply 12' may be a pressure sensitive paper having pattern screened deadened adhesive (used as the light tack adhesive) disposed substantially in register with the removable cup portion 26' of the label 10'. This results in the semi-adherence of the label 10' (at least at the removable portion 26') to the article. And the top ply 14' may be a non-pressure sensitive, raw paper or film with or without a clear overlaminant adhered to the face surface 20' thereof. This top ply is permanently adhered to the face of the base ply material, with a void of glue in the center cup functioning area. This web is permanently adhered along the edges 38', 40' of the cup shape to create a seal along certain outer edges (as will be described in greater detail below).

Next, as can be seen from the Figures, the first and second layers 12', 14' (i.e., base ply 12' and top ply 14') of the label 10' include die cuts 24' that define a border between the removable cup portion 26' of the label 10' and the remainder of the label 10'. The die cuts 24' may be of any type, depth, etc. that allows for removal of the cup portion when needed.

Perforations may also be used. During preparation of the label 10' during the in-line process, with the webs printed and spot adhered together, a single tool die cuts the label shape. The external portion cuts the entire label shape, with internal cuts creating the cup within the label 10'.

Further, as noted above, a second adhesive 32' may be positioned between the first layer 12' (base ply) and second layer 14' (top ply). Thus, when the layers of the label 10' are fully assembled (as shown in FIG. 9A), this second adhesive 32' adheres at least a portion of the face surface 16' of the base ply 12' to the back surface 22' of the top ply 14'. As can be particularly seen in FIG. 6A, this second adhesive 32' (e.g., a permanent glue) is positioned on both sides of the die cuts 24'. Thus, while the majority of the second adhesive 32' coats the face surface 16' of the base ply 12' that is not part of the removable portion 26' (in the embodiment shown in FIGS. 6A-10B), at least a portion (forming strips of adhesive, are present on the removable portion 26' along the length of the die cuts 24'. These strips of second adhesive 32' serve to keep the two edges 38', 40' (formed by edges 38', 40' of removable portion base ply and top ply) of the cup permanently bonded to one another to allow for the closed receptacle area of the cup.

Further, the majority of the second adhesive 32' is positioned on the face surface 16' of the base ply 12' along the sides of the removable portion 26' of the label 10'. And a portion of second adhesive 32' is present adjacent the bottom region 44' of cup portion 26'. However, there is no second adhesive along the top portion 42' of the removable cup portion 26'. This allows the cup portion 26' to be open at its top end 42' once removed from the remainder of the label 10'.

Figure 8A:
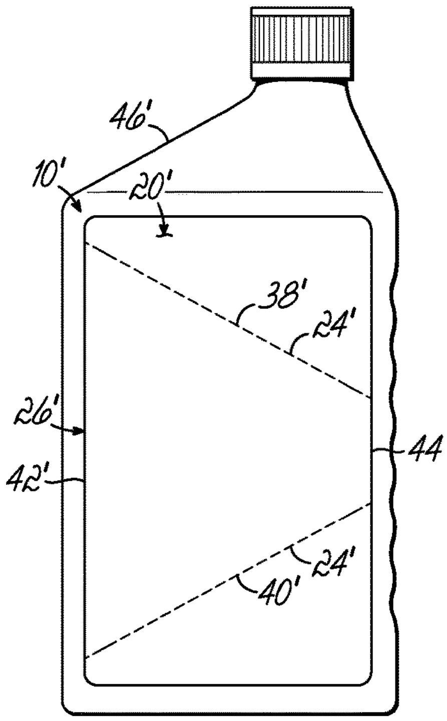
FIG. 8A is a view of the second embodiment of a label associated with an article.
Figure 8B:
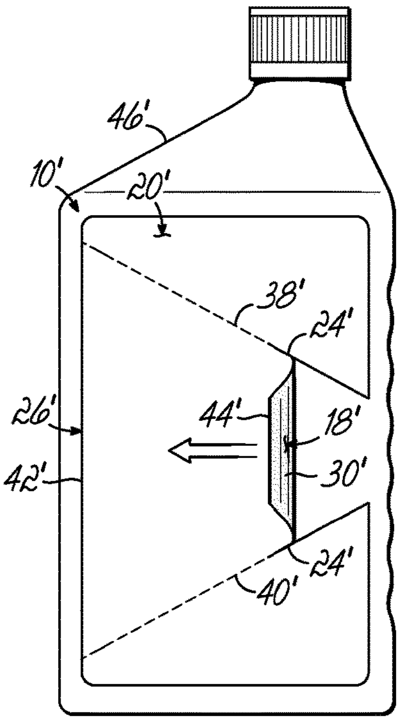
FIG. 8B is a view of the second embodiment of a label associated with an article, depicting removal of a cup portion of the label from the remainder of the label.

Following assembly, the label 10' may be applied to an article 46' (such as the article 46' shown in FIGS. 8A and 8B). FIG. 8A shows the second embodiment of the label 10' applied to the article 46', and FIG. 8B shows the beginning of removal of the removable cup portion 26' of the label 10' from the remainder of label 10', and from article 46'. Removal occurs along die cuts 24'.

Figure 10A:
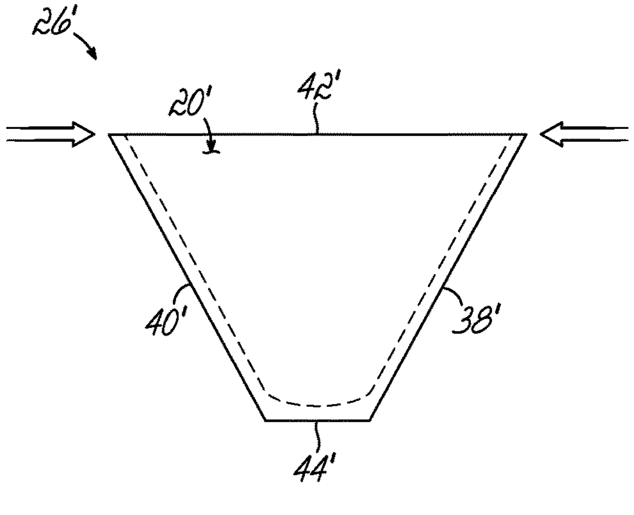
FIG. 10A is a view of the cup portion having been removed from the second embodiment of the label.
Figure 10B:
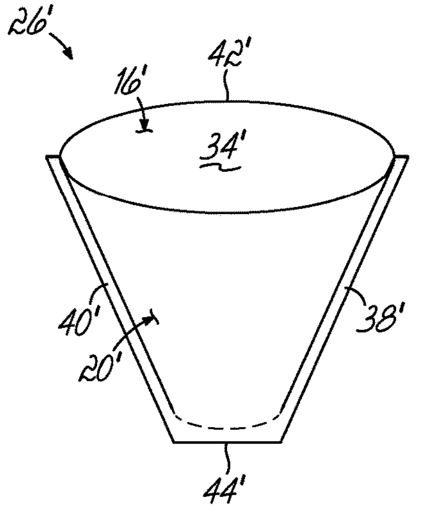
FIG. 10B is a view of the cup portion of the second embodiment having been opened for use as a cup.

Once removed, the cup portion may be opened, such as by pressing side edges 38', 40' of cup toward one another (as represented in FIG. 10A). This forms an open cup as shown in FIG. 10B with permanently glued side edges 38', 40' and bottom end 44', and open top end 42' of cup. A cross-section view of the label 10', with the cup removed and opened can be seen in FIG. 9B. The varnish (seen in FIGS. 6A, 7B, and 9A)—such as second varnish 34', or second and third varnishes 34', 36'—is disposed on inside surface of open cup. This allows for ease of opening cup, and may also contribute to liquid impermeability of the cup.

A third embodiment of a label in accordance with aspects of the present invention is shown in FIGS. 11A-16B. The concept of this third embodiment includes a label—such as an in-mold label—having a removable portion that may form another object, such as a funnel. The label of this embodiment, an in-mold label including a removable funnel portion, may be formed from a single in-line process. Thus, the design of such a removable funnel portion within a multi-ply label created entirely from an in-line construction, results in a label having a funnel that is not a pre-produced secondary funnel that is applied and/or attached to a label (as is seen in the prior art).

The label, then, includes a funnel by constructing multiple layers of differing label materials—such as paper and/or film. Pattern printing of tinted and spot coatings, spot adhesive, spot printed cold glue, along with positioned internal die cuts may be used to create a funnel from the multi-ply label when the portion that can form the funnel is removed. In particular, the third embodiment as illustrated in the figures shows a 3-ply material of in-line construction, with a funnel built into the label for removal therefrom. Designed cut tooling, coatings, glue, and adhesive are used to create the label and funnel.

Figure 11A:
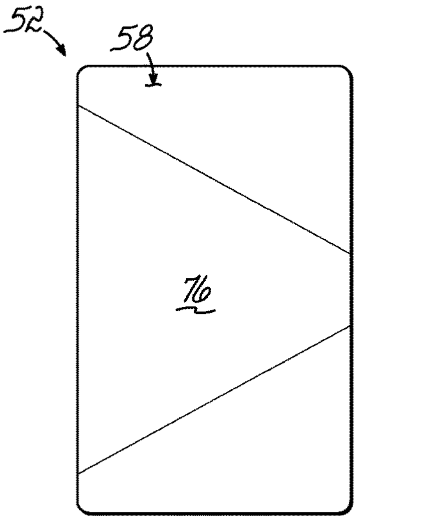
FIG. 11A is a view of a face surface of a base layer of a third embodiment of a label in accordance with principles of the present invention.
Figure 11B:
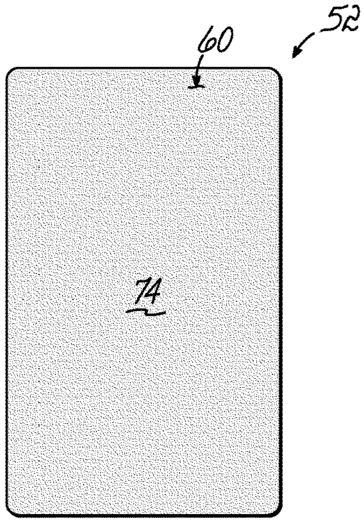
FIG. 11B is a view of a back surface of the base layer of the third embodiment of a label in accordance with principles of the present invention.
Figure 12A:
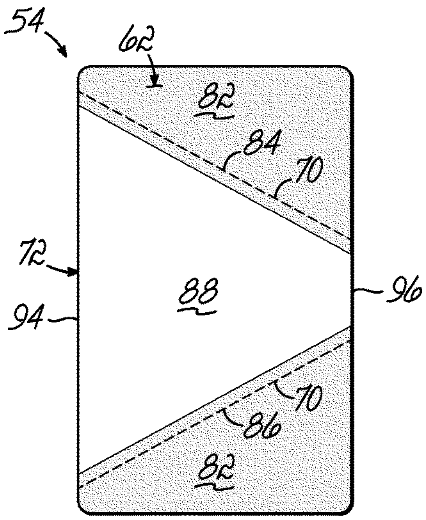
FIG. 12A is a view of a face surface of a middle layer of the third embodiment of a label in accordance with principles of the present invention.
Figure 12B:
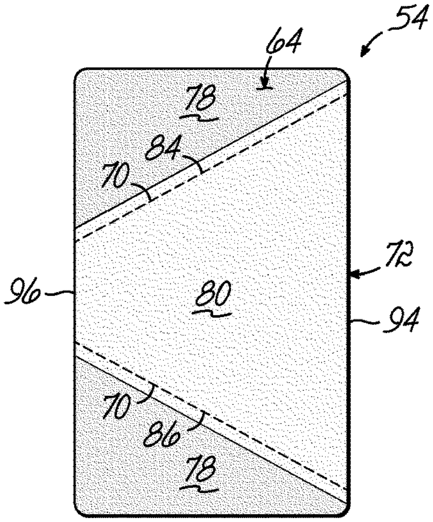
FIG. 12B is a view of a back surface of a middle layer of the third embodiment of a label in accordance with principles of the present invention.
Figure 13A:
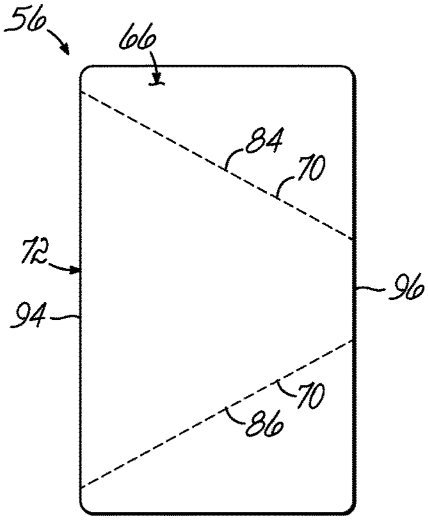
FIG. 13A is a view of a face surface of a top layer of the third embodiment of a label in accordance with principles of the present invention.
Figure 13B:
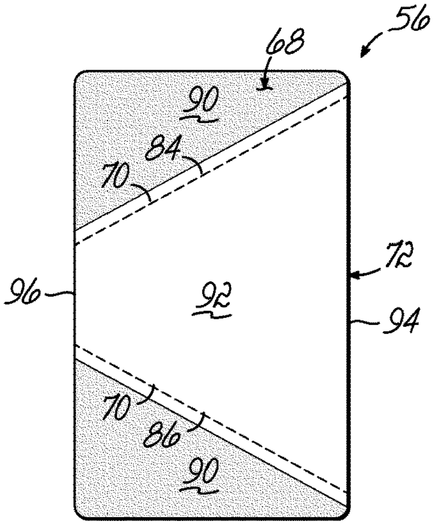
FIG. 13B is a view of a back surface of the top layer of the third embodiment of a label in accordance with principles of the present invention.

More specifically, and referring to FIGS. 11A-13B, the label 50 of this third embodiment includes a first layer 52 (a base ply layer—seen in FIGS. 11A and 11B), a second layer 54 (a mid-ply layer—seen in FIGS. 12A and 12B), and a third layer 56 (a top ply layer—seen in FIGS. 13A and 13B). FIG. 11A shows a face surface 58 of the base ply 52 (i.e., the surface that will be positioned to confront the mid-ply 54). FIG. 11B shows the back surface 60 of the base ply 52 (i.e., the surface that will be positioned to confront an article to which the label 50 may be applied). FIG. 12A shows a face surface 62 of the mid-ply 54 (i.e., the surface that will be positioned to confront the top ply 56 of the label 50). FIG. 12B shows the back surface 64 of the mid-ply 54 (i.e., the surface that will be positioned to confront the face surface 58 of the base ply 52). FIG. 13A shows a face surface 66 of the top ply 56 (i.e., the surface that will be positioned to face away from other layer(s) of the label 50). And FIG. 13B shows a back surface 68 of the top ply 56 (i.e., the surface that will be positioned to confront the face surface 62 of the mid-ply 54).

As can be seen in FIGS. 11A-13B the various back and face surfaces of the base ply 52, mid-ply 54, and top ply 56 may include other materials applied thereto (such materials may include adhesives and varnishes). And, as can be seen in the figures, the various layers include cuts 70 that serve to help define the removable funnel portion 72 of the label 50 (and facilitate the removal of the funnel portion 72 for use). The use of the other materials—such as adhesives, varnishes, etc.—also facilitate removal of that funnel portion 72. Thus, once the layers of the label 50 are assembled (e.g., as shown in cross-section in FIG. 15A), the full construction of the third embodiment of the label 50 including a removable funnel portion 72 may be seen.

Figure 15A:
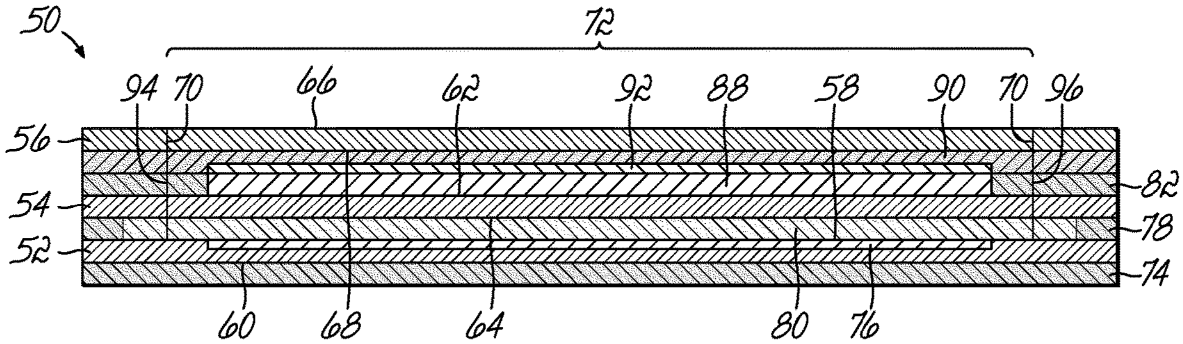
FIG. 15A is a cross-section view of the layers of the third embodiment of a label.
Figure 15B:
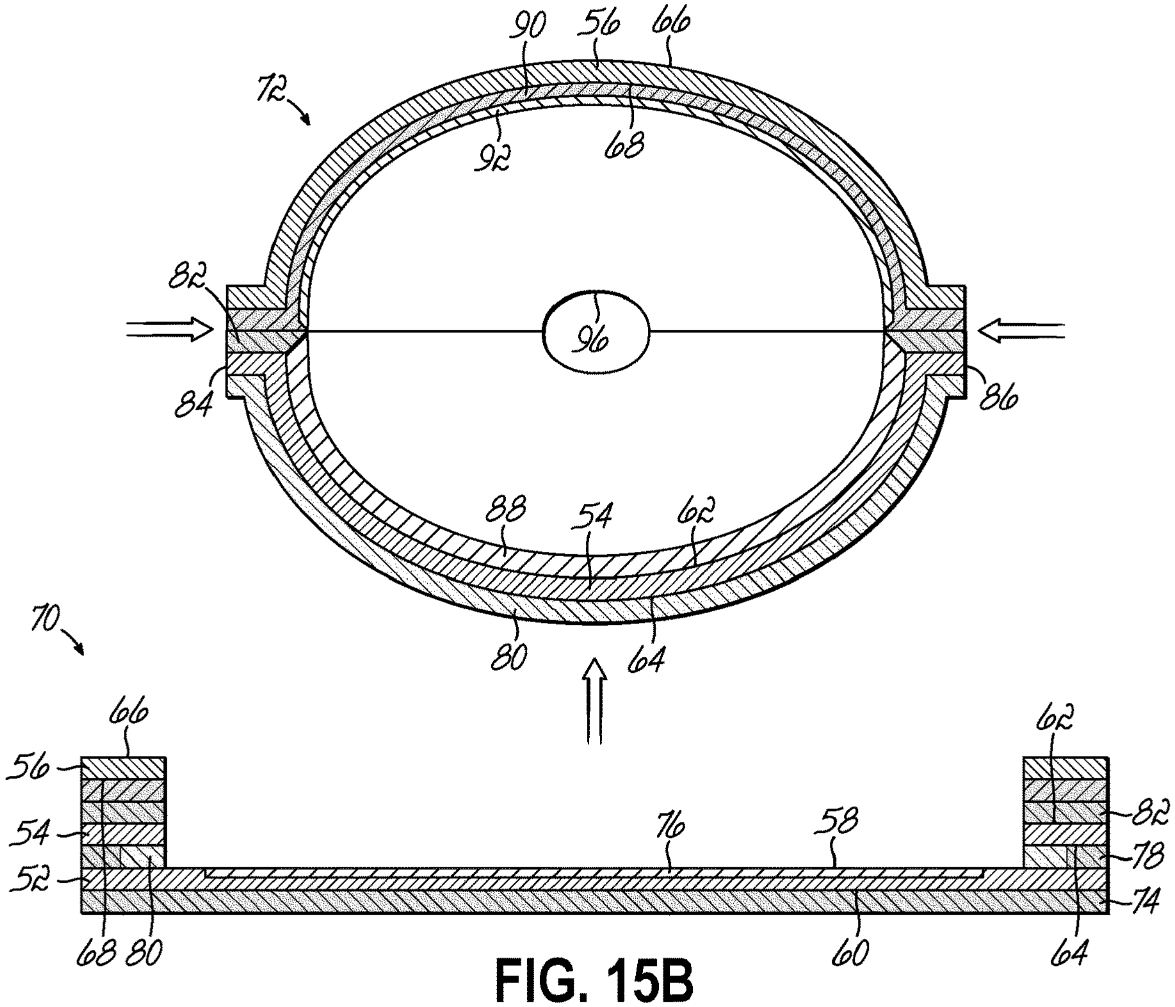
FIG. 15B is a cross-section view of the funnel portion of the third embodiment removed from the label and opened.

More specifically, and referring to FIG. 15A, a cross section of the third embodiment of the label 50 is shown. Each of the first layer 52 (base ply), second layer 54 (mid-ply), and third layer 56 (top ply) can be seen in cross-section. As can be seen in FIG. 15A (as well as in FIG. 11B), the back surface 60 of the base ply 52 includes a first adhesive 74 (e.g., a permanent adhesive)—which assists in adhering the label 50 to an article, as the article is formed in a mold (in the example of an in-mold label). The face surface 58 of the base ply 52 includes a first varnish 76 (e.g., a spot varnish in this embodiment) positioned on a portion of the face surface 58 that is substantially in register with the removable funnel portion 72 of the label 50 once the label 50 is constructed (this can also be seen in FIG. 11A). The positioning of this first varnish 76 can assist in the ease of removing the removable funnel portion 72 of the label 50 from the remainder of the label 50. A second adhesive 78—e.g., a permanent adhesive—is positioned on a portion of the back surface 64 of the mid-ply 54. This adhesive can also be seen in FIG. 12B. It assists in affixing the portion of the back surface 64 of the mid-ply 54 that is not part of the removable funnel portion 72 to the face surface 58 of the base ply 52. A deadener 80 (e.g., a tinted spot deadener) is applied onto/into the adhesive in an area of the adhesive that is substantially in register with the removable funnel portion 72 (this can also be seen in FIG. 12B). This tinted deadener 80 serves to reduce the tack of the permanent adhesive in the area of the removable portion 72.

As described above, the opposite side of the second layer 54 (i.e., the face surface 62 of the mid-ply 54) is positioned to confront other layer(s) of the label 50—e.g., the third layer 56 (top ply) in the third embodiment. In this configuration, another adhesive (a third adhesive 82) may be positioned between the second layer 54 (mid-ply) and third layer 56 (top ply). In particular, the face surface 62 of the mid-ply 54 has a third adhesive 82 (e.g., a permanent adhesive) applied thereto (mostly on the portion that does not constitute a part of the removable funnel portion 72—see FIG. 12A). Thus, when the layers of the label 50 are fully assembled (as shown in FIG. 15A), this third adhesive 82 assists in adhering at least a portion of the face surface 62 of the mid-ply 54 to the back surface 68 of the top ply 56. In particular, in the third embodiment, this third adhesive 82 (permanent adhesive) is applied to those areas of the face surface 62 that are not part of the removable portion 72 (though there is a small overlap on the removable portion 72 proximal to the edges 84, 86 of the removable funnel portion 72. (In FIG. 12A, this adhesive is shown as being disposed on the face surface 62 of the mid-ply 54 prior to assembly. However, in alternate embodiments, it may be the case that the third adhesive 82 is first applied to the back surface 68 of the top ply 56 before being brought into contact with the face surface 62 of the mid-ply 54. Still alternatively, such third adhesive 82 may be applied to both a portion of the face surface 62 of mid-ply 54 and a portion of back surface 68 of top ply 56.

Further, as can be seen in the Figures, a second varnish 88 is applied to the face surface 62 of the mid-ply 54 in a location generally matching the portion of the mid-ply 54 that includes the removable funnel portion 72. This second varnish 88 is shown in FIG. 12A and can be seen in cross-section in FIG. 15A. And, as can be seen in the Figures, a fourth adhesive 90 (e.g., a permanent adhesive is applied to the back surface 68 of the top ply 56, with a further third varnish 92 being applied to that fourth adhesive 90 in a location generally matching the portion of the back ply that includes the removable funnel portion 72. This third varnish 92 is shown in FIG. 13B and can be seen in cross-section in FIG. 15A.

Further, as can be seen in FIGS. 13A and 13B, the top ply 56 is a ply is positioned on top of the fourth layer of adhesive 90 with varnish layer 92, with the back surface 68 of the top ply 56 being adjacent to the fourth layer of adhesive 90 and varnish layer 92 (as shown in FIG. 15A).

Thus, in certain iterations of the third embodiment of the label 50, the base ply 52 may be an IML label (having an adhesive that allows affixation to an article on its back surface 60), with pattern screened coatings applied to the face surface thereof. The mid-ply 54 is an IML label material adhered to the face surface 58 of the base ply 52, with pattern screened coatings applied to the face surface 62 of the mid-ply 54. And the top ply 56 may be an IML label material adhered to the face surface 62 of the mid-ply 54, with a deadened adhesive center for removable funnel functioning area. This web is permanently adhered along the edges 84, 86 of the funnel shape to create a seal along both outer sides (as will be described in greater detail below).

Next, as can be seen from the Figures, the second and third layers (i.e., mid-ply 54 and top ply 56) of the label 50 include die cuts 70 that define a border between the removable funnel portion 72 of the label 50 and the remainder of the label 50. The die cuts 70 may be of any type, depth, etc. that allows for removal of the funnel portion 72 when needed. Perforations may also be used. During preparation of the label 50 during the in-line process, with the webs printed and spot adhered together, a single tool die cuts the label shape. The external portion cuts the entire label shape, with internal cuts creating the funnel within the label 50.

Further, as noted above, a third adhesive 82 may be positioned between the second layer 54 (mid-ply) and third layer 56 (top ply). Thus, when the layers of the label 50 are fully assembled (as shown in FIG. 15A), this third adhesive 82 adheres at least a portion of the face surface 62 of the mid-ply 54 to the back surface 68 of the top ply 56. As can be particularly seen in FIG. 12A, this third adhesive 82 (e.g., a permanent adhesive) is positioned on both sides of the die cuts 70. Thus, while the majority of the third adhesive 82 coats the face surface 62 of the mid-ply 54 that is not part of the removable portion 72 (in the embodiment shown in FIGS. 12A-16B), at least a portion (forming strips of adhesive), are present on the removable portion 72 along the length of the die cuts 70. These strips of third adhesive 82 serve to keep the two edges 84, 86 of the funnel (formed by edges of removable portion 72 of mid-ply 54 and top ply 56) permanently bonded to one another to allow for the receptacle area of the funnel.

Further, the majority of the third adhesive 82 is positioned on the face surface 62 of the mid-ply 54 along the sides of the removable portion 72 of the label 50. However, there is no third adhesive along the top portion 94 of the removable funnel portion 72 or along the bottom portion of the removable funnel portion 72. This allows the funnel portion 72 to be open at its top end 94 once removed from the remainder of the label 50.

Figures 14A, 14B:
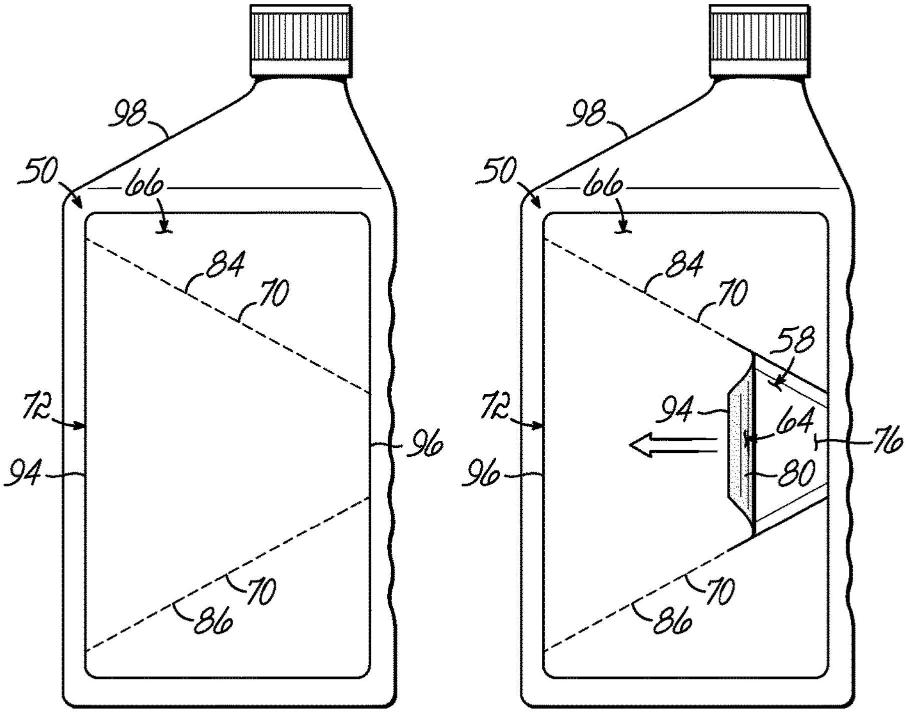
FIG. 14A is a view of the third embodiment of a label associated with an article.
FIG. 14B is a view of the third embodiment of a label associated with an article, depicting removal of a funnel portion of the label from the remainder of the label.

Following assembly, the label 50 may be applied to an article 98 (such as the article shown in FIGS. 14A and 14B). FIG. 14A shows the third embodiment of the label 50 applied to the article 98, and FIG. 14B shows the beginning of removal of the removable funnel portion 72 of the label 50 from the remainder of label 50 and from article 98. Removal occurs along die cuts 70.

Figure 16A:
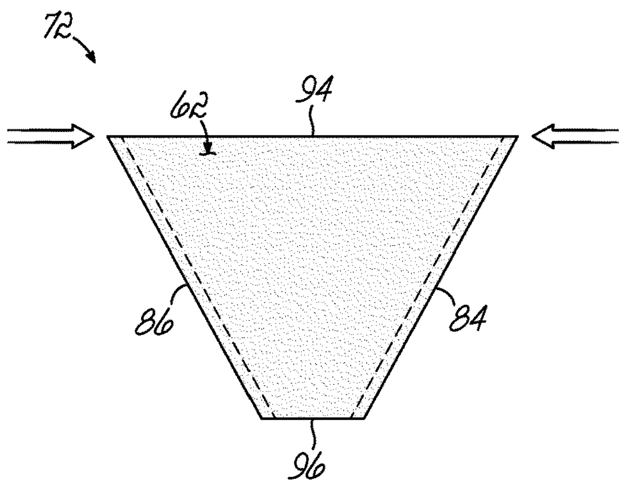
FIG. 16A is a view of the funnel portion having been removed from the third embodiment of the label.
Figure 16B:
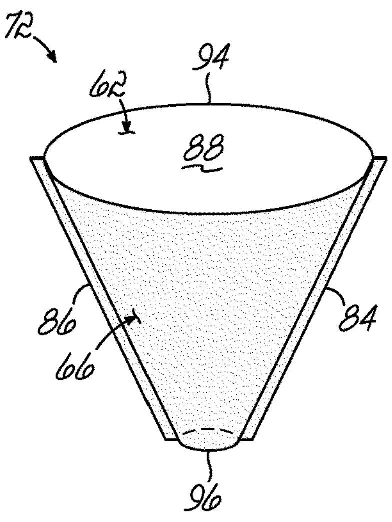
FIG. 16B is a view of the funnel portion of the third embodiment having been opened for use as a funnel.

Once removed, the funnel portion 72 may be opened, such as by pressing side edges 84, 86 of funnel toward one another (as represented in FIG. 16A). This forms an open funnel as shown in FIG. 16B with permanently glued side edges 84, 86, and open top and bottom ends 94, 96 of funnel. A cross-section view of the label 50, with the funnel removed and opened can be seen in FIG. 15B. The first varnish (seen in FIGS. 12A and 15A at reference numerals 76 and 76', respectively) and deadener (seen in FIGS. 13B and 15A at reference numerals 80 and 80', respectively) is disposed on inside surface of open funnel. This allows for ease of opening funnel and may also contribute to liquid impermeability of the funnel.

A fourth embodiment of a label in accordance with aspects of the present invention is shown in FIGS. 17A-22B. The concept of this fourth embodiment includes a label—such as an in-mold label—having a removable portion that may form another object, such as a cup. The label of this embodiment, an in-mold label including a removable cup portion, may be formed from a single in-line process. Thus, the design of such a removable cup portion within a multi-ply label created entirely from an in-line construction, results in a label having a cup that is not a pre-produced secondary cup that is applied and/or attached to a label (as is seen in the prior art).

The label, then, includes a cup by constructing multiple layers of differing label materials—such as paper and/or film. Pattern printing of tinted and spot coatings, spot adhesive, spot printed cold glue, along with positioned internal die cuts may be used to create a cup from the multi-ply label when the portion that can form the cup is removed. In particular, the fourth embodiment as illustrated in the figures shows a 3-ply material of in-line construction, with a cup built into the label for removal therefrom. Designed cut tooling, coatings, glue, and adhesive are used to create the label and cup.

Figure 17A:
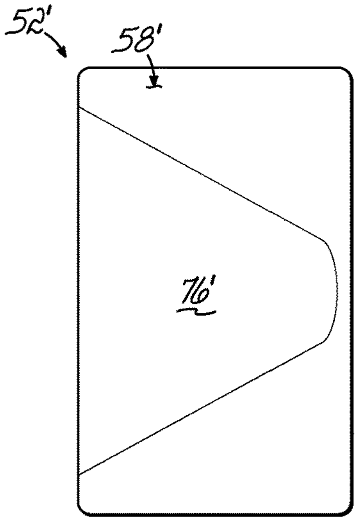
FIG. 17A is a view of a face surface of a base layer of a fourth embodiment of a label in accordance with principles of the present invention.
Figure 17B:
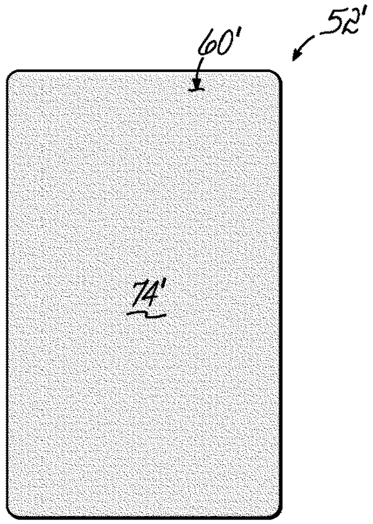
FIG. 17B is a view of a back surface of the base layer of the fourth embodiment of a label in accordance with principles of the present invention.
Figure 18A:
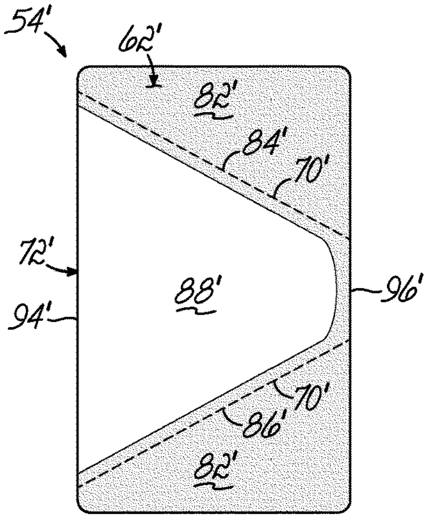
FIG. 18A is a view of a face surface of a middle layer of the fourth embodiment of a label in accordance with principles of the present invention.
Figure 18B:
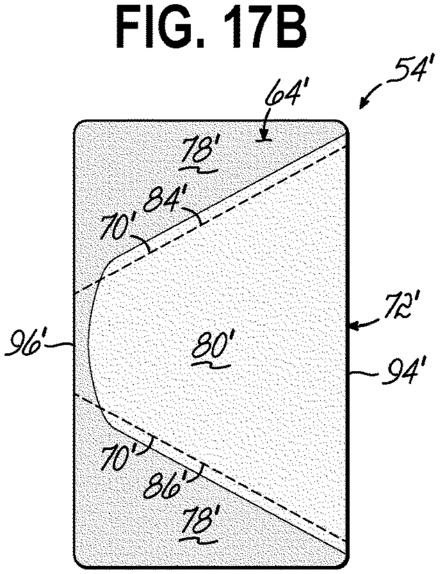
FIG. 18B is a view of a back surface of a middle layer of the fourth embodiment of a label in accordance with principles of the present invention.
Figure 19A:
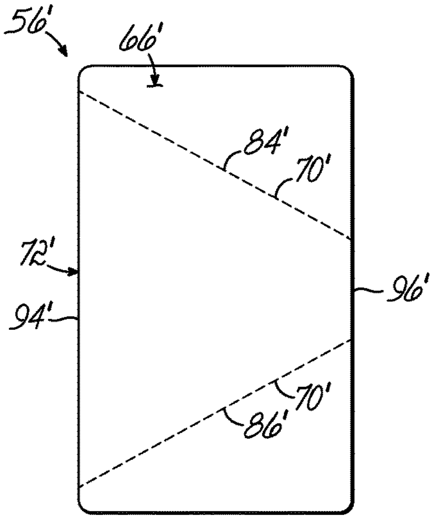
FIG. 19A is a view of a face surface of a top layer of the fourth embodiment of a label in accordance with principles of the present invention.
Figure 19B:
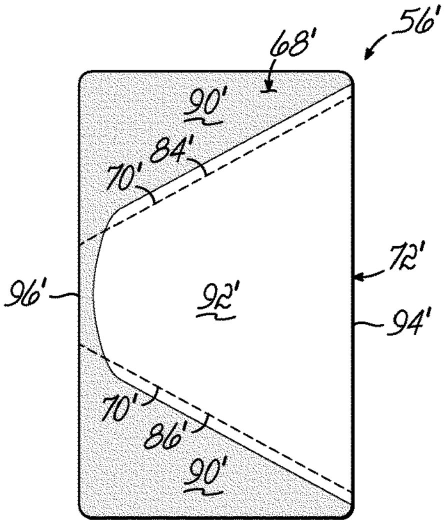
FIG. 19B is a view of a back surface of the top layer of the fourth embodiment of a label in accordance with principles of the present invention.

More specifically, and referring to FIGS. 17A-19B, the label 50' of this fourth embodiment includes a first layer 52' (a base ply layer—seen in FIGS. 17A and 17B), a second layer 54' (a mid-ply layer—seen in FIGS. 18A and 18B), and a third layer 56' (a top ply layer—seen in FIGS. 19A and 19B). FIG. 17A shows a face surface 58' of the base ply 52' (i.e., the surface that will be positioned to confront the mid-ply 54'). FIG. 17B shows the back surface 60' of the base ply 52' (i.e., the surface that will be positioned to confront an article to which the label 50' may be applied). FIG. 18A shows a face surface 62' of the mid-ply 54' (i.e., the surface that will be positioned to confront the top ply 56' of the label 50'). FIG. 18B shows the back surface 64' of the mid-ply 54' (i.e., the surface that will be positioned to confront the face surface 58' of the base ply 52'). FIG. 19A shows a face surface 66' of the top ply 56' (i.e., the surface that will be positioned to face away from other layer(s) of the label 50'). And FIG. 19B shows a back surface 68' of the top ply 56' (i.e., the surface that will be positioned to confront the face surface 62' of the mid-ply 54').

As can be seen in FIGS. 17A-19B the various back and face surfaces of the base ply 52', mid-ply 54', and top ply 56' may include other materials applied thereto (such materials may include adhesives and varnishes). And, as can be seen in the figures, the various layers include cuts 70' that serve to help define the removable cup portion 72' of the label 50' (and facilitate the removal of the cup portion 72' for use). The use of the other materials—such as adhesives, varnishes, etc.—also facilitate removal of that cup portion 72'. Thus, once the layers of the label 50' are assembled (e.g., as shown in cross-section in FIG. 21A), the full construction of the fourth embodiment of the label 50' including a removable cup portion 72' may be seen.

Figure 21A:
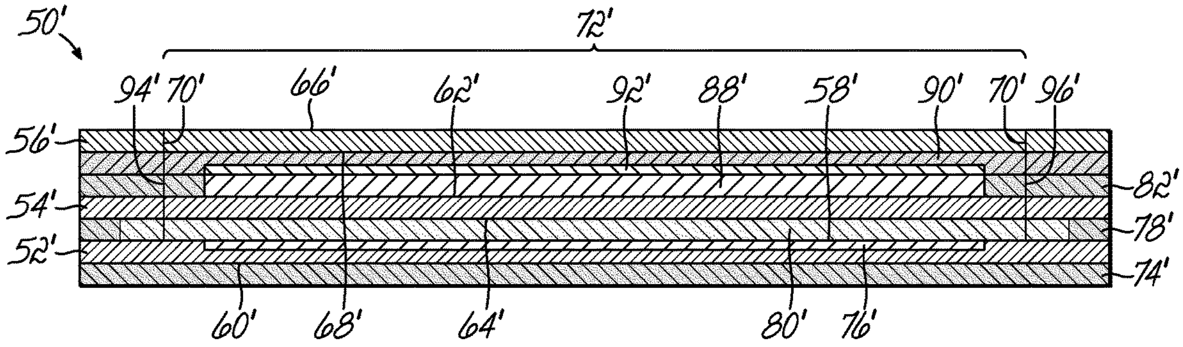
FIG. 21A is a cross-section view of the layers of the fourth embodiment of a label.
Figure 21B:
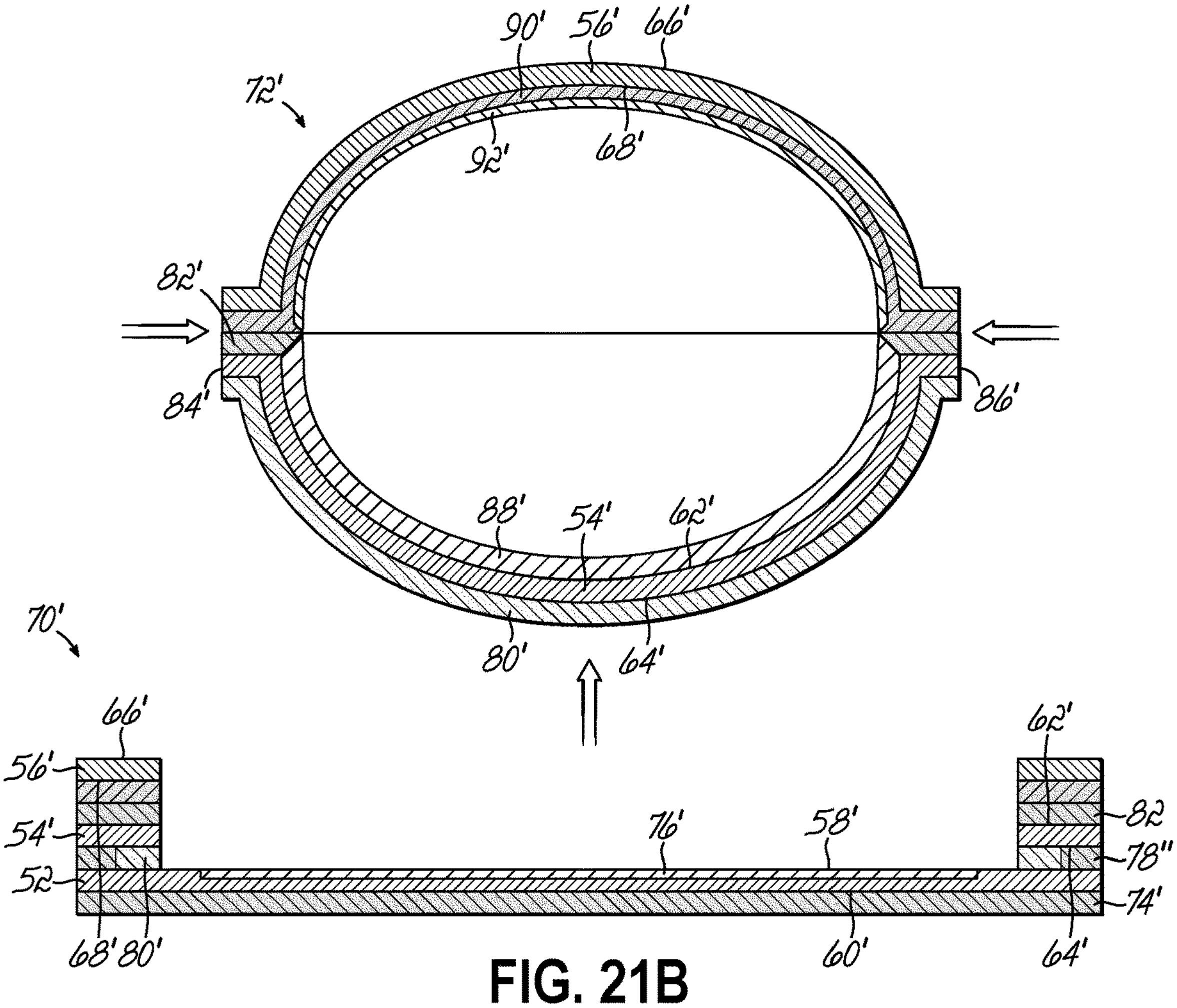
FIG. 21B is a cross-section view of the cup portion of the fourth embodiment removed from the label and opened.

More specifically, and referring to FIG. 21A, a cross section of the fourth embodiment of the label 50' is shown. Each of the first layer 52' (base ply), second layer 54' (mid-ply), and third layer 56' (top ply) can be seen in cross-section. As can be seen in FIG. 21A (as well as in FIG. 17B), the back surface 60' of the base ply 52' includes a first adhesive 74' (e.g., a permanent adhesive)—which assists in adhering the label 50' to an article, as the article is formed in a mold (in the example of an in-mold label). The face surface 58' of the base ply 52' includes a first varnish 76' (such as a spot varnish in this embodiment) positioned on a portion of the face surface 58' that is substantially in register with the removable cup portion 72' of the label 50' once the label 50' is constructed (this can also be seen in FIG. 17A). The positioning of this first varnish 76' can assist in the ease of removing the removable cup portion 72' of the label 50' from the remainder of the label 50'. A second adhesive 78'—e.g., a permanent adhesive—is positioned on a portion of the back surface 64' of the mid-ply 54'. This adhesive can also be seen in FIG. 18B. It assists in affixing the portion of the back surface 64' of the mid-ply 54' that is not part of the removable cup portion 72' to the face surface 58' of the base ply 52'. A deadener 80' (e.g., a tinted spot deadener) is applied onto/into the adhesive in an area of the adhesive that is substantially in register with the removable cup portion 72' (this can also be seen in FIG. 18B). This tinted deadener 80' serves to reduce the tack of the permanent adhesive in the area of the removable portion 72'.

As described above, the opposite side of the second layer 54' (i.e., the face surface 62' of the mid-ply 54') is positioned to confront other layer(s) of the label 50'—e.g., the third layer 56' (top ply) in the fourth embodiment. In this configuration, another adhesive (a third adhesive 82') may be positioned between the second layer 54' (mid-ply) and third layer 56' (top ply). In particular, the face surface 62' of the mid-ply 54' has a third adhesive 82' (e.g., a permanent adhesive) applied thereto (mostly on the portion that does not constitute a part of the removable cup portion 72', and along the bottom of the cup—see FIG. 18A). Thus, when the layers of the label 50' are fully assembled (as shown in FIG. 21A), this third adhesive 82' assists in adhering at least a portion of the face surface 62' of the mid-ply 54' to the back surface 68' of the top ply 56'. In particular, in the fourth embodiment, this third adhesive 82' (permanent adhesive) is applied to those areas of the face surface 62' that are not part of the removable portion 72' (though there is a small overlap on the removable portion 72' proximal to the edges 84', 86' of the removable cup portion 72'. (In FIG. 18A, this adhesive is shown as being disposed on the face surface 62' of the mid-ply 54' prior to assembly. However, in alternate embodiments, it may be the case that the third adhesive 82' is first applied to the back surface 68' of the top ply 56' before being brought into contact with the face surface 62' of the mid-ply 54'. Still alternatively, such third adhesive 82' may be applied to both a portion of the face surface 62' of mid-ply 54' and a portion of back surface 68' of top ply 56'.

Further, as can be seen in the Figures, a second varnish 88' is applied to the face surface 62' of the mid-ply 54' in a location generally matching the portion of the mid-ply 54' that includes the removable cup portion 72'. This second varnish 88' is shown in FIG. 18A and can be seen in cross-section in FIG. 21A. And, as can be seen in the Figures, a fourth adhesive 90' is applied to the back surface 68' of the top ply 56', with a further third varnish 92' being applied to that fourth adhesive 90' in a location generally matching the portion of the back ply that includes the removable cup portion 72'. This third varnish 92' is shown in FIG. 19B and can be seen in cross-section in FIG. 21A.

Further, as can be seen in FIGS. 19A and 19B, the top ply 56' is a ply is positioned on top of the fourth layer of adhesive 90' with varnish layer 92', with the back surface 68' of the top ply 56' being adjacent to the fourth layer of adhesive 90' and varnish layer 92' (as shown in FIG. 21A).

Thus, in certain iterations of the fourth embodiment of the label 50', the base ply may be an IML label (having an adhesive that allows affixation to an article on its back surface), with pattern screened coatings applied to the face surface thereof. The mid-ply is an IML label material adhered to the face surface of the base ply, with pattern screened coatings applied to the face surface of the mid-ply. And the top ply may be an IML label material adhered to the face surface of the mid-ply, with a deadened adhesive center for removable cup functioning area. This web is permanently adhered along the edges 84', 86' of the cup shape to create a seal along both outer sides (as will be described in greater detail below).

Next, as can be seen from the Figures, the second and third layers (i.e., mid-ply 54' and top ply 56') of the label 50' include die cuts 70' that define a border between the removable cup portion 72' of the label 50' and the remainder of the label 50'. The die cuts 70' may be of any type, depth, etc. that allows for removal of the cup portion 72' when needed. Perforations may also be used. During preparation of the label 50' during the in-line process, with the webs printed and spot adhered together, a single tool die cuts the label shape. The external portion cuts the entire label shape, with internal cuts creating the cup within the label 50'.

Further, as noted above, a third adhesive 82' may be positioned between the second layer 54' (mid-ply) and third layer 56' (top ply). Thus, when the layers of the label 50' are fully assembled (as shown in FIG. 21A), this third adhesive 82' adheres at least a portion of the face surface 62' of the mid-ply 54' to the back surface 68' of the top ply 56'. As can be particularly seen in FIG. 18A, this third adhesive 82' (e.g., a permanent adhesive) is positioned on both sides of the die cuts 70' and along the bottom of the cup on the removable portion 72'. Thus, while the majority of the third adhesive 82' coats the face surface 62' of the mid-ply 54' that is not part of the removable portion 72' (in the embodiment shown in FIGS. 18A-22B), at least a portion (forming strips of adhesive), are present on the removable portion 72' along the length of the die cuts 70'. These strips of third adhesive 82' serve to keep the two edges 84', 86' of the cup (formed by edges 84', 86' of removable portion 72' of mid-ply 54' and top ply 56') permanently bonded to one another to allow for the receptacle area of the cup.

Further, the majority of the third adhesive 82' is positioned on the face surface 62' of the mid-ply 54' along the sides of the removable portion 72' of the label 50'. However, there is no third adhesive along the top portion 94' of the removable cup portion 72'. However, there is third adhesive 82' along the bottom portion 96' of the removable cup portion 72'. This allows the cup portion 72' to be open at its top end 94' (but closed at bottom end 96') once removed from the remainder of the label 50'.

Figure 20A:
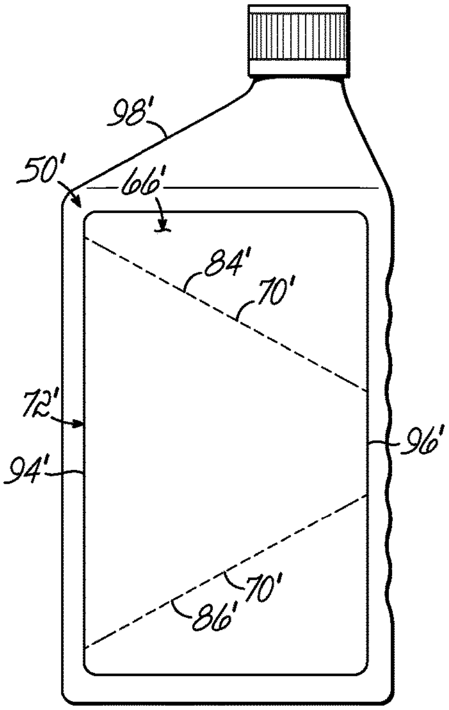
FIG. 20A is a view of the fourth embodiment of a label associated with an article.
Figure 20B:
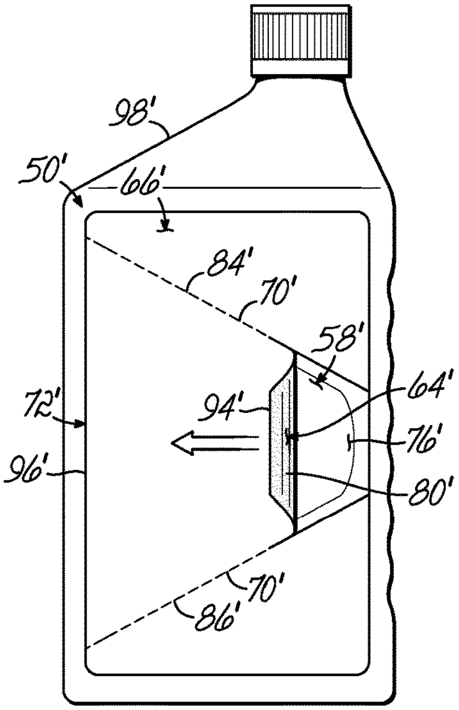
FIG. 20B is a view of the fourth embodiment of a label associated with an article, depicting removal of a cup portion of the label from the remainder of the label.

Following assembly, the label 50' may be applied to an article 98' (such as the article 98' shown in FIGS. 20A and 20B). FIG. 20A shows the fourth embodiment of the label 50' applied to the article 98', and FIG. 20B shows the beginning of removal of the removable cup portion 72' of the label 50' from the remainder of label 50' and from article 98'. Removal occurs along die cuts 70'.

Figure 22A:
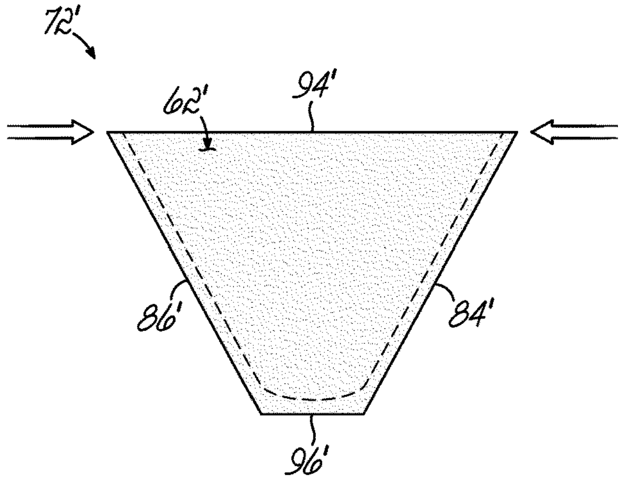
FIG. 22A is a view of the cup portion having been removed from the fourth embodiment of the label.
Figure 22B:
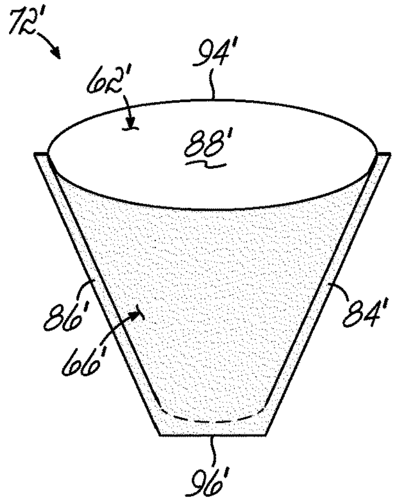
FIG. 22B is a view of the cup portion of the fourth embodiment having been opened for use as a funnel.

Once removed, the cup portion 72' may be opened, such as by pressing side edges 84', 86' of cup toward one another (as represented in FIG. 22A). This forms an open cup as shown in FIG. 22B with permanently glued side edges 84', 86' and bottom portion 96' of cup, and open top end 94' of cup. A cross-section view of the label 50', with the cup removed and opened can be seen in FIG. 21B. The two layers of varnish (seen in FIGS. 18A, 19B, and 21A) are disposed on inside surface of open cup. This allows for ease of opening cup and may also contribute to liquid impermeability of the cup.

While the present invention has been disclosed by reference to the details of preferred embodiments of the invention, it is to be understood that the disclosure is intended as an illustrative rather than in a limiting sense, as it is contemplated that modifications will readily occur to those skilled in the art, within the spirit of the invention and the scope of the amended claims.

What is claimed is:

1. A label comprising:

a plurality of layers, including a first layer and a second layer, that form a first portion and a second portion of the label;

the first portion adapted to be affixed to an article; and the second portion adapted to be separated from the first portion and removed from the remainder of the label;

wherein the first layer includes a face surface and a back surface, and further comprising a first adhesive disposed on the back surface of the first layer;

wherein the second portion is defined by at least one feature that facilitates removal of the second portion;

wherein the second portion includes at least two layers adhered to one another along at least two edges thereof and forms a second article following separation from the first portion; and wherein the second article includes an interior space capable of receiving a material therein or therethrough.

2. The label of claim 1, wherein the at least one feature is selected from the group consisting of a cut, a perforation, and a weakened area.

3. The label of claim 1, wherein the second layer includes a face surface and a back surface, and wherein the second layer is positioned relative to the first layer such that the back surface of the second layer faces the face surface of the first layer.

4. The label of claim 3, further comprising a second adhesive disposed between at least a portion of the first layer and at least a portion of the second layer to adhere at least a portion of the first layer and second layer to one another.

5. The label of claim 4, wherein the second adhesive is positioned on at least a portion of the face surface of the first layer or on at least a portion of the back surface of the second layer.

6. The label of claim 4, wherein the at least one feature is disposed in, on, or through, the first and second layers, and wherein the at least one feature defines the second portion of the label that is separable from the first portion of the label.

7. The label of claim 6, wherein the separable portion includes at least a portion of the first layer and a portion of the second layer.

8. The label of claim 6, wherein the second adhesive is positioned between portions of the first and second layers that comprise the first portion of the label.

9. The label of claim 8, further comprising a first varnish disposed on a portion of the first adhesive, wherein the first varnish is disposed in substantial registration with the second portion of the label that is separable from the first portion of the label.

10. The label of claim 8, further comprising a second varnish disposed on the face surface of first layer in substantial registration with the second portion of the label, or on the back surface of the second layer in substantial registration with the second portion of the label.

11. The label of claim 8, further comprising a second varnish disposed on the face surface of first layer in substantial registration with the second portion of the label, and a third varnish disposed on the back surface of the second layer in substantial registration with the second portion of the label.

12. The label of claim 8, wherein the second adhesive is present along at least an edge portion of the separable portion of the label, the edge portion being present along the at least one feature.

13. The label of claim 1, wherein the second article capable of being formed by the separable portion of the label is chosen from a funnel and a cup.

14. A label comprising:

a plurality of layers, including a first layer and a second layer, that form a first portion and a second portion of the label;

the first portion adapted to be affixed to an article; and the second portion adapted to be separated from the first portion and removed from the remainder of the label;

wherein the second portion is defined by at least one feature that facilitates removal of the second portion;

wherein the second portion includes at least two layers adhered to one another along at least two edges thereof and forms a second article following separation from the first portion;

wherein the second article includes an interior space capable of receiving a material therein or therethrough; and wherein the label is a pressure sensitive label.

15. A label comprising:

a plurality of layers that form a first portion and a second portion of the label;

the first portion adapted to be affixed to an article; and the second portion adapted to be separated from the first portion and removed from the remainder of the label;

wherein the second portion is defined by at least one feature that facilitates removal of the second portion;

wherein the second portion includes at least two layers adhered to one another along at least two edges thereof and forms a second article following separation from the first portion;

wherein the second article includes an interior space capable of receiving a material therein or therethrough; and wherein the plurality of layers includes a first layer, a second layer, and a third layer.

16. The label of claim 15, wherein the first layer includes a face surface and a back surface, and further comprising a first adhesive disposed on the back surface of the first layer.

17. The label of claim 16, wherein the first adhesive is flood coated on the back surface.

18. The label of claim 16, wherein the second layer includes a face surface and a back surface, and further comprising a second adhesive disposed on the back surface of the second layer.

19. The label of claim 18, wherein the third layer includes a face surface and a back surface, and wherein the third layer is positioned relative to the second layer such that the back surface of the third layer faces the face surface of the second layer.

20. The label of claim 19, further comprising a third adhesive disposed between at least a portion of the second layer and at least a portion of the third layer to adhere at least a portion of the second layer and third layer to one another.

21. The label of claim 20, wherein the third adhesive is positioned on at least a portion of the face surface of the second layer or on at least a portion of the back surface of the third layer.

22. The label of claim 20, wherein the third adhesive is positioned on at least a portion of the face surface of the second layer, and further comprising a fourth adhesive on the back surface of the third layer.

23. The label of claim 20, wherein the at least one feature is disposed in, on, or through, the second and third layers, and wherein the at least one feature defines the second portion of the label that is separable from the first portion of the label.

24. The label of claim 23, wherein the separable portion includes at least a portion of the second layer and a portion of the third layer.

25. The label of claim 23, wherein the third adhesive is positioned between portions of the second and third layers that comprise the first portion of the label.

26. The label of claim 25, further comprising a first varnish disposed on a portion of the face surface of the first layer, wherein the first varnish is disposed in substantial registration with the second portion of the label that is separable from the first portion of the label.

27. The label of claim 25, further comprising a second varnish disposed on the face surface of second layer in substantial registration with the second portion of the label, or on the back surface of the third layer in substantial registration with the second portion of the label.

28. The label of claim 25, further comprising a second varnish disposed on the face surface of second layer in substantial registration with the second portion of the label, and a third varnish disposed on the back surface of the third layer in substantial registration with the second portion of the label.

29. The label of claim 25, further comprising a deadener on the back surface of the second layer in substantial registration with the second portion of the label.

30. The label of claim 25, wherein the third adhesive is present along at least an edge portion of the separable portion of the label, the edge portion being present along the at least one feature.

31. The label of claim 15, wherein the label is an in-mold label.

32. The label of claim 15, wherein the second article capable of being formed by the separable portion of the label is chosen from a funnel and a cup.

* * * * *